United States Patent [19]
Katayama et al.

[11] Patent Number: 5,418,353
[45] Date of Patent: May 23, 1995

[54] NON-CONTACT, ELECTROMAGNETICALLY COUPLED TRANSMISSION AND RECEIVING SYSTEM FOR IC CARDS

[75] Inventors: Yosuke Katayama, Toride; Wasao Takasugi, Higashiyamato; Toshiharu Ieki, Yokosuka; Takashi Takeuchi, Fujisawa, all of Japan

[73] Assignees: Hitachi Maxell, Ltd., Osaka; NII Data Communications Systems Corporation, Tokyo, both of Japan

[21] Appl. No.: 325,643

[22] Filed: Oct. 19, 1994

Related U.S. Application Data

[63] Continuation of Ser. No. 915,596, Jul. 21, 1992, abandoned.

[30] Foreign Application Priority Data

| Jul. 23, 1991 | [JP] | Japan | 3-205633 |
| Jul. 23, 1991 | [JP] | Japan | 3-205702 |
| Nov. 11, 1991 | [JP] | Japan | 3-321497 |
| Nov. 11, 1991 | [JP] | Japan | 3-321503 |

[51] Int. Cl.6 .................................................. G06K 5/00
[52] U.S. Cl. .................................... 235/380; 235/375; 235/492
[58] Field of Search ............................. 235/380, 492

[56] References Cited

U.S. PATENT DOCUMENTS

| 4,814,595 | 3/1989 | Gilboa . | |
| 4,818,855 | 4/1989 | Mongeon | 235/492 |
| 4,899,036 | 2/1990 | McCrindle et al. | 235/492 |
| 4,918,416 | 4/1990 | Walton et al. | 235/497 |
| 4,924,171 | 5/1990 | Baba et al. . | |
| 4,928,000 | 5/1990 | Eglise et al. | 235/492 |
| 5,113,184 | 5/1992 | Katayama . | |

FOREIGN PATENT DOCUMENTS

| 0147099 | 7/1985 | European Pat. Off. . |
| 0267009 | 5/1988 | European Pat. Off. . |
| 0430291 | 6/1991 | European Pat. Off. . |
| 2198014 | 6/1988 | United Kingdom . |
| WO8810433 | 12/1988 | WIPO . |
| WO8901208 | 9/1989 | WIPO . |

*Primary Examiner*—Harold Pitts

[57] ABSTRACT

A non-contact IC card communication in which power consumption of a driver of a reader/writer is reduced and the size of a power supply circuit for operating the driver is made small. The driver has a low output impedance. A current detecting circuit including a detecting coil magnetically coupled with a transceiver coil of the reader/writer through a magnetic coiling element and a resistor detects a current which flows through the transceiver coil. A voltage drop to be detected is small and is approximately constant for a variation of the transceiver coil current. When data is read from an IC card, a load of the driver is changed. The driver drives the transceiver coil in a constant voltage fashion even if a current flowing through the transceiver coil changes due to the change in load. Input voltages of a rectifying/smoothing circuit and a regulator in the IC card become approximately constant. As a result, the amplitude of a high frequency output voltage of the driver can be made small. Also, a high frequency signal current sent from a reader/writer is subjected to double modulation including amplitude modulation by card data and modulation by second information, such as information indicative of the abnormality of an IC card, in synchronism with a timing at which data transmission between the reader/writer and the card is made, and the second information is extracted by the reader/writer.

14 Claims, 15 Drawing Sheets

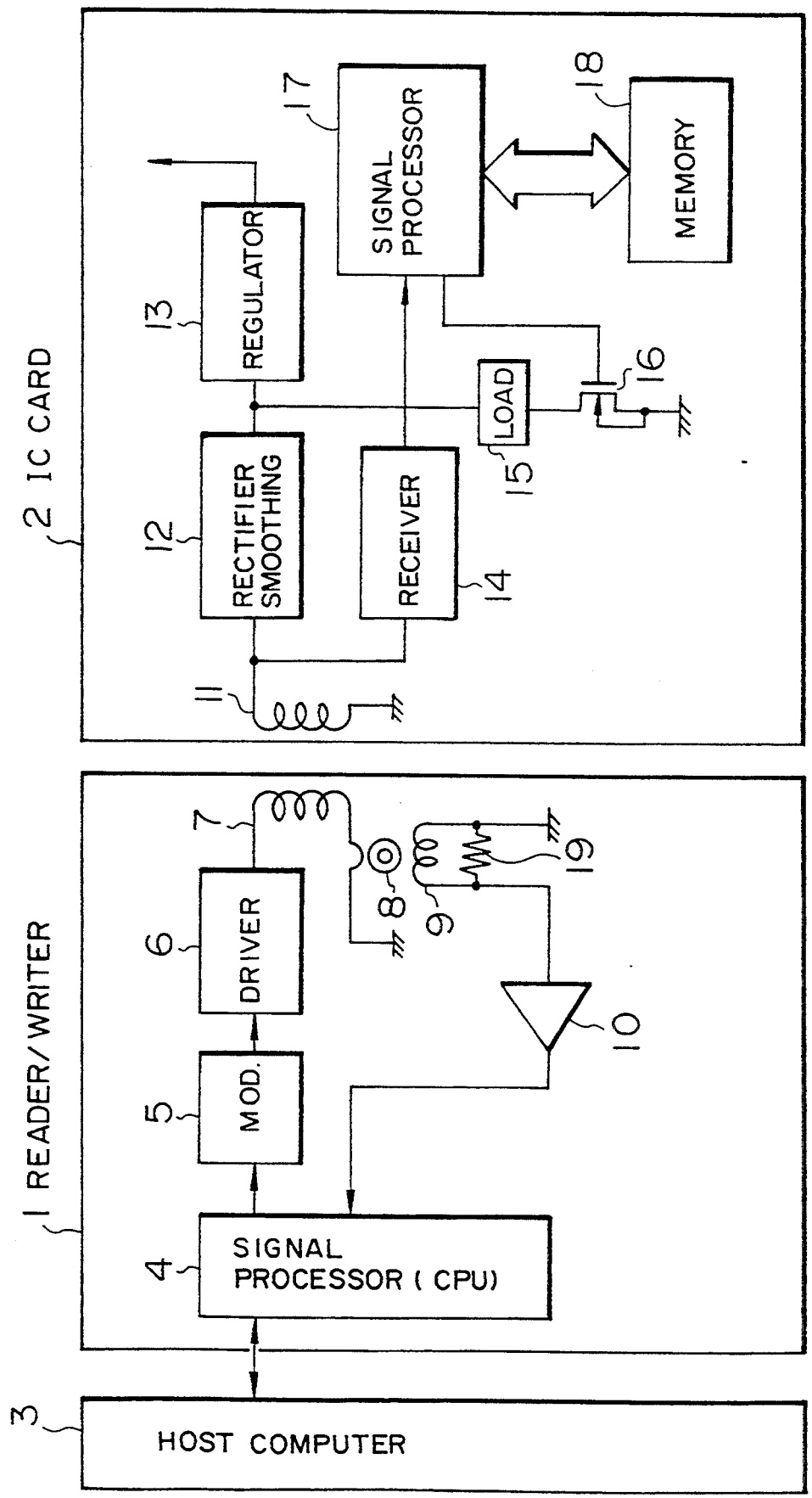

NON-CONTACT, ELECTROMAGNETICALLY COUPLED TRANSMISSION AND RECEIVING SYSTEM FOR IC CARDS

This application is a continuation of application Ser. No. 07/915,596, filed on Jul. 21, 1992, now abandoned.

BACKGROUND OF THE INVENTION

1. Field of the Invention

The present invention relates to a recording medium reader/writer system for writing and reading data in and from a recording medium such as a non-contact IC card and a non-contact IC card system utilizing the same.

2. Discussion of Related Art

Though the conventional IC card is of a contact type in which the card has an electrical contact and the card is brought into connection to an IC card reader/writer system (hereinafter simply referred to as reader/writer) by bringing the electrical contact of the card into contact with an electrical contact of the reader/writer, a non-contact IC card has been proposed in which coils are used in lieu of the electrical contacts and the card is magnetically coupled to a reader/writer by the coils in a non-contact fashion, as disclosed by, for example, U.S. Pat. No. 5,113,184 issued May 12, 1992 (or its corresponding European Patent Application No. 88308709.0 filed Sep. 26, 1988).

The following explanation will be made of a non-contact IC card. Therefore, a non-contact IC card will merely be referred to as an IC card. In the U.S. Pat. No. 5,113,184, the IC card has a coil made of a metal loop and electronic switching means for making short-circuit/open-circuit between opposite ends of the coil and the reader/writer has a transmitter coil and a receiver coil which are coaxially provided at a predetermined interval. The reader/writer and the IC card are connected to each other by inserting the coil of the IC card between the transmitter and receiver coils of the reader/writer so that the coils are magnetically coupled.

In the case where data is to be read from the IC card, a sinusoidal or rectangular high frequency signal is supplied from an oscillator circuit to the transmitter coil and the electronic switching means of the IC card is turned on and off in accordance with "1" and "0" bits of data. Thereby, the amplitude of a high frequency signal induced in the receiver coil by magnetic fluxes generated from the transmitter coil by the high frequency signal from the oscillator circuit makes a change. The reader/writer reads data from the IC card by amplifying, rectifying and amplitude-detecting the high frequency signal having such a change.

IC cards need a supply voltage for driving a microcomputer incorporated therein, an external memory or the like. In a contact IC card, an electrical contact for the exclusive use for power supply is provided and a DC supply voltage is supplied from a reader/writer through this electrical contact. In a non-contact IC card, a high frequency signal is sent from a reader/writer through coils and a predetermined supply voltage is obtained by processing the high frequency signal by a rectifying/smoothing circuit and a regulator.

In the case where data is to be transmitted from a reader/writer to an IC card, a driver circuit drives a coil by a high frequency signal the amplitude, frequency or phase of which is modulated in accordance with the data. On the other hand, in the case where the reader/writer reads data from the IC card, the reader/writer reads the data in the above-mentioned manner, that is, in such a manner that the driver circuit drives a coil by a high frequency signal having a fixed amplitude and a change in amplitude of a high frequency current of the coil caused by the turn-on and turn-off of electronic switching means in the IC card is detected.

In the prior art reader/writer, however, since a general driver circuit using the existing linear amplifier or the like is used as the above-mentioned driver circuit, there is a problem that a power consumption of the driver circuit becomes too large. On the other hand, means for detecting the high frequency current of the coil includes current to voltage conversion means, for example, a resistor having a large resistance value, by which the detection is made from a voltage drop corresponding to the amplitude of the high frequency current. Therefore, in reading data from the IC card, the amplitude of a high frequency voltage supplied to the coil may vary in accordance with the turn-on and turn-off of the electronic switching means in the IC card.

On the IC card side, a predetermined supply voltage is necessary even when the reader/writer reads data from the IC card. This supply voltage is obtained from the high frequency voltage supplied from the reader/writer, as mentioned above. However, if the high frequency voltage does not have a large amplitude, a predetermined or stable supply voltage becomes unobtainable on the IC card side when the amplitude of the high frequency voltage varies in accordance with the turn-on and turn-off of the electronic switching means corresponding to data to be transmitted from the IC card to the reader/writer. Accordingly, it is required to obtain a predetermined supply voltage even at the minimum amplitude of the high frequency voltage. Namely, it is required that the amplitude of the high frequency voltage to drive the coil is made sufficiently large. This is attended with an excess power consumption.

On the other hand, if the amplitude of the high frequency voltage is small, there is a problem that the S/N ratio upon data detection becomes insufficient and sure data detection is therefore impossible. Accordingly, in the conventional system, it is required that the driver circuit in the reader/writer outputs a high frequency voltage having a large amplitude enough for compensation for a large voltage drop in the current detecting means. Thus, it is also required that a supply voltage for operating the driver circuit is sufficiently high. As a result, there is a problem that a power consumption of the reader/writer becomes large and a power supply circuit and hence the reader/writer becomes large in size.

In the conventional non-contact IC card, when an abnormal condition occurs, a CPU of the IC card detects the abnormal condition and sends the result of detection to a reader/writer. On the reader/writer side, a host computer judges the abnormal condition of the IC card (and further the kind of abnormality) from the result of detection sent from the IC card side.

In such an IC card, there may be the case where a transceiver circuit falls into an abnormal condition and the IC card is operated in a state in which the transceiver circuit is in the abnormal condition. In the worst case, there may be a fear that the IC card is destroyed.

On the other hand, the assignee of the present application has proposed, in Japanese Patent Application No. 3-205693 filed Jul. 23, 1991, a system in which means for detecting an abnormal condition is provided in an IC card and information detected by the detecting means is transmitted to a reader/writer in a manner similar to a data.

SUMMARY OF THE INVENTION

An object of the invention is to provide a non-contact communication type of recording medium reader/writer system which has a reduced power consumption and can be realized with a small size, and an IC card system utilizing the same.

Another object of the present invention is to provide a non-contact IC card system which can realize the simultaneous and sure accomplishment of data transmission from a reader/writer to an IC card and data transmission from the IC card to the reader/writer, that is, the sure accomplishment of a data multiplex transmission function.

To attain the above object, according to one feature of the present invention, a coil driver circuit of a recording medium reader/writer is constructed using a circuit of a constant voltage driving type which has a low output impedance and means for detecting a coil current obtained from the recording medium side through electromagnetic coupling is constructed using a circuit in which a voltage drop as a signal to be detected is made sufficiently small.

The operation of the above circuit construction will now be explained. When data is to be read from the recording medium, a high frequency voltage having a fixed amplitude is applied from the driver circuit of the reader/writer to a coil and is transmitted to the recording medium through electromagnetic coupling and the amplitude of a current flowing through the coil changes in accordance with data from the recording medium. Since the output impedance of the driver circuit is low, the driver circuit drives the coil in a constant voltage fashion. Also, since a voltage drop in the coil current detecting means is sufficiently small irrespective of the coil current, the amplitude of a high frequency voltage applied to the coil becomes substantially constant even if the amplitude of the coil current changes.

To attain the other object mentioned above, according to one aspect of the present invention, a high frequency signal sent from a reader/writer is modulated by first information of usual data and by second information from abnormal condition detecting means or the like independent of the first information in synchronism with a timing at which data transmission is made between the reader/writer and an IC card, and the reader/writer extracts the second information from the high frequency signal.

The reader/writer can extract the second information by judging the presence/absence of the second information from a relationship between a level of the high frequency signal at an end portion of a data period and a level thereof immediately after the end portion.

The operation of a circuit construction according to the above aspect will now be explained. A CPU in the reader/writer operates in accordance with an instruction from a host computer to take in the output of a receiver circuit only upon data transmission. For example, the second information such, as abnormally detection information, is sent in synchronism with the period of data transmission between the reader/writer and the IC card. Since the second information is sent to the reader/writer in only the data transmission period, this information is surely taken in the CPU. Also, since the second information is not transmitted in a period of time when it is not taken in the CPU, a wasteful power consumption in such a period can be avoided.

Further, when only data is transmitted in either the case where data is transmitted with a high frequency signal being modulated in a modulation system such as phase modulation or frequency modulation in which the amplitude is fixed or the case where data is transmitted with the high frequency signal being amplitude modulated, a level of the high frequency signal at a portion of a data period in which the high frequency signal has been subjected to modulation by data for example, an end portion of the data period can be made equal to a level of the high frequency signal at an unmodulated portion. On the other hand, since the second information or detection information is sent from the IC card to the reader/writer in the data transmission period in the same method as a method in which data is sent from the card to the reader/writer, a high frequency signal current on the reader/writer side is amplitude-modulated by the detection information. Accordingly, a level of the high frequency signal current at a specified portion of the data transmission period becomes equal to a level of the high frequency signal at an unmodulated portion when the detection information is not transmitted and is different from the level of the high frequency signal at the unmodulated portion when the detection information is transmitted. As a result, it is possible to surely judge the presence/absence of the detection information from a relationship between the level of the high frequency signal at the specified portion of the data transmission period and a level of the high frequency signal at a period when no data is transmitted.

Also, with the above construction, a full-duplex communication function can be realized in which the second information, such as abnormality detection information, can be detected surely even if the second information is transmitted in a form superimposed on data. In addition, even if the amplitude of the high frequency signal is not kept constant, for example, due to a variation in the condition of coupling of coils between the reader/writer and the IC card, no influence is given on the detection of the second information.

BRIEF DESCRIPTION OF THE DRAWINGS

FIG. 1 is a block diagram showing an embodiment of a non-contact IC card system according to the present invention;

DETAILED DISCUSSION OF THE INVENTION

Figure 2A:
FIGS. 2A and 2B are diagrams showing the waveform of write data in the system shown in FIG. 1 and the waveform of a high frequency signal modulated by the write data.

Embodiments of the present invention will now be explained in reference to the accompanying drawings.

FIG. 1 is a block diagram showing an embodiment of a recording medium reader/writer system according to the present invention together with an IC card which is an example of a recording medium. There is seen a recording medium reader/writer system (or reader/writer) 1, an IC card 2, a host computer 3, a signal processor 4, a modulating circuit 5, a driver circuit 6, a coil 7, a magnetic core 8, a detecting coil 9, a comparator, numeral 10, a coil 11, a rectifying/smoothing circuit 12, a voltage regulator 13, a receiver circuit 14, a load resistor 15, a MOS switch 16, a signal processor 17, a memory 18, and a resistor 19.

In FIG. 1, in the case where data is to be written into the IC card 2, the data to be written is outputted from the host computer 3 and supplied to the reader/writer 1. In the reader/writer 1, the data is processed by the signal processor 4 and is supplied to the modulating circuit 5 in which a high frequency signal having a fixed amplitude is modulated by the data in the form of amplitude modulation, frequency modulation, phase modulation or the like. The data-modulated high frequency signal is supplied to the coil 7 through the driver circuit 6.

The IC card 2 is coupled to the reader/writer 1 so that the coil 7 of the reader/writer 1 and the coil 11 of the IC card 2 are magnetically coupled to each other. Accordingly, the data-modulated high frequency signal is transmitted from the reader/writer 1 to the IC card 2 by the coils 7 and 11.

Figure 2B:

FIG. 2A shows data inputted to the modulation circuit 5. Provided that the modulating circuit 5 makes an amplitude modulation, a high frequency signal transmitted from the reader/writer 1 to the IC card 2 by the coils 7 and 11 has a signal waveform shown in FIG. 2B.

In the IC card 2, a high frequency signal outputted from the coil 11 is rectified and smoothed by the rectifying/smoothing circuit 12 and is thereafter supplied to the regulator 13 which in turn forms a predetermined supply voltage. The high frequency signal from the coil 11 is also supplied to the receiver circuit 14 and is demodulated thereby into data. The demodulated data is processed by the signal processor 17 and is then written into the memory 18.

A series circuit including the load resistor 15 and the MOS switch 16 is connected between an output end of the rectifying/smoothing circuit 12 and a grounding conductor or the ground. In the case where data is written, the MOS switch 16 is turned off.

The output impedance of the driver circuit 6 is sufficiently low.

A current detecting circuit including the magnetic core 8, the detecting coil 9 and the resistor 19 is provided in series with the coil 7. The current detecting circuit detects a current which flows through the coil 7 (or a coil current). The magnetic core 8 is, for example, a ring-like magnetic core and an electric wire passing through a central hole of the magnetic core is connected as a primary coil to the coil 7. The detecting coil 9 is wounded N times (N: a positive integer) around the magnetic core and the resistor 19 for converting a detection current of the detecting coil 9 into a voltage is connected between opposite ends of the detecting coil 9, thereby forming a so-called current transformer.

In the case where data of the memory 18 in the IC card 2 is to be read by the reader/writer 1, the modulating circuit 5 outputs an unmodulated high frequency signal having a fixed amplitude. This signal is transmitted to the IC card 2 through the driver circuit 6 and by the coils 7 and 11. In the IC card 2, the high frequency signal from the coil 11 is subjected to a process similar to that at the time of data write. Namely, the signal is rectified and smoothed by the rectifying/smoothing circuit 12 and is thereafter supplied to the regulator 13 which in turn forms a supply voltage.

Figure 3A:
FIGS. 3A and 3B are diagrams showing the waveforms of read data and a detection current in the system shown in FIG. 1.
Figure 3B:

On the other hand, data read from the memory 18 is processed by the signal processor 17 and is thereafter supplied to the MOS switch 16. FIG. 3B shows data supplied to the MOS switch 16. It is assumed that the MOS switch 16 is turned on when the data is "1" and is turned off when the data is "0".

When the MOS switch 16 is turned on, there results in the addition of the load resistor 15. Namely, a load when the coil side is seen from opposite ends of the coil 7 or a load of the driver circuit 6 increases. As a result, a high frequency current flowing through the coil 7 increases. When the MOS switch 16 is turned off, the high frequency current flowing through the coil 7 decreases. FIG. 3A shows the waveform of the high frequency current of the coil 7 for the data shown in FIG. 3B. This high frequency current is detected by the detecting coil 9 and is converted into a high frequency voltage by the resistor 19. Thereafter, the high frequency voltage is subjected to envelope detection and waveform shaping by the comparator 10 and the subsequent circuit so that data is extracted. The data is processed by the signal processor 4 and is thereafter sent to the host computer 3 or the like.

The output impedance of the driver circuit 6 is low and so is the input impedance of the current detecting circuit including the magnetic core 8. The detecting coil 9 and the resistor 19 is sufficiently small so that a voltage drop at the current detecting circuit is sufficiently small irrespective of a current which flows therethrough. Accordingly, in the data read as described above, even if the amplitude of the current flowing through the coil 7 changes in accordance with the turn-on and turn-off of the MOS switch 16, as mentioned above, the amplitude of a high frequency voltage applied to the coil 7 is kept approximately constant. Accordingly, a high frequency voltage in the coil 11 is also approximately constant and the high frequency voltage inputted to the rectifying/smoothing circuit 12 has an approximately constant amplitude irrespective of the turn-on and turn-off of the MOS switch 16. Thus, a rectified voltage inputted to the regulator 13 has an approximately constant amplitude.

As a result, it becomes possible to select the amplitude of a high frequency voltage outputted from the driver circuit 6 so that it is approximately the minimum amplitude necessary for obtaining a predetermined supply voltage at the regulator 13, and it is possible to reduce an excess power consumption in a power supply circuit in the IC card. Also, in contrast with the conventional system in which the amplitude of a high frequency voltage output of a driver circuit must be increased by a magnitude corresponding to a decrease in amplitude of the high frequency voltage resulting from the output impedance of the driver circuit and a voltage drop at a current detecting circuit, a supply voltage for operating the driver circuit 6 can be reduced, thereby making it possible to attain the reduction of a power consumption. Further, it is possible to make the size of the power supply circuit small.

Figure 4:
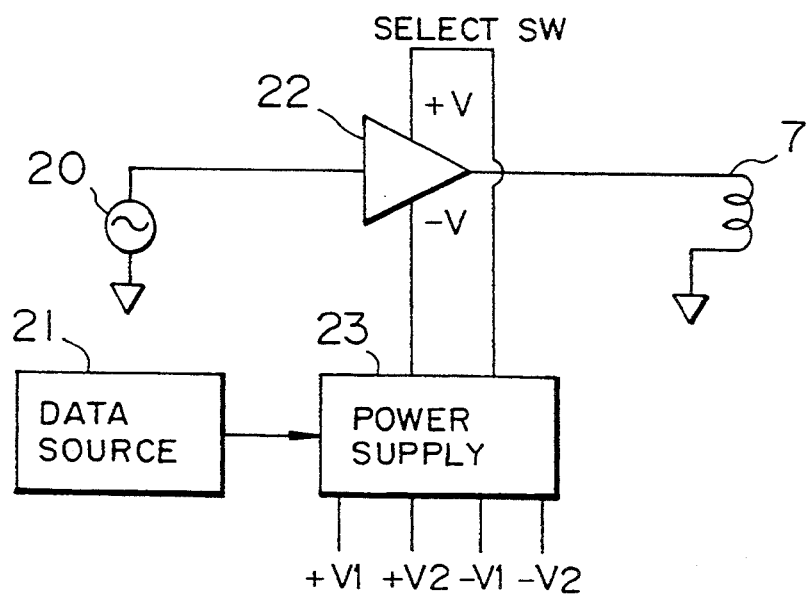
FIG. 4 is a diagram showing the construction of a specific example of a modulating circuit and a driver circuit shown in FIG. 1.

FIG. 4 is a diagram showing the construction of an specific example of the modulating circuit 5 and the driver circuit 6 shown in FIG. 1. There is seen an oscillator 20, a data output circuit or data source 21, a selecting switch circuit 22, and a power supply circuit 23.

In FIG. 4, the selecting switch circuit 22 has both the function of the modulating circuit 5 (see FIG. 1) as an amplitude modulation circuit and the function of the driver circuit 6. The oscillator 20 outputs a high frequency pulse signal as a carrier and supplies it to the selecting switch circuit 22. The selecting switch circuit 22 is applied with supply voltages of +V and −V from the power supply circuit 23 and selects and outputs +V, for example, in a period of time when the carrier from the oscillator 20 is "H" (or in a high level) and −V in a period when the carrier is "L" (or in a low level).

The power supply circuit 23 is controlled by data from the data source 21 in the signal processor 4 (see FIG. 1) so that the positive and negative supply voltages of ±V applied to the selecting switch circuit 2 become ±V1 for "1" of data and +V2 for "0" of data. Provided that $|V1|$ is larger than $|V2|$, a high frequency signal shown in FIG. 2B for the data shown in FIG. 2A is obtained from the selecting switch circuit 22 and is supplied to the coil 7.

Figure 5:
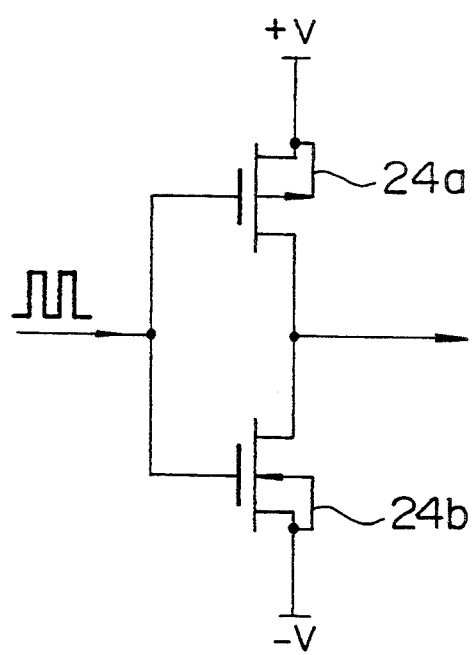
FIG. 5 is a circuit diagram showing a principle of a selecting switch circuit shown in FIG. 4.

FIG. 5 is a circuit diagram showing a driver composed of complementary switches as a specific example of the selecting switch circuit 22, shown in FIG. 4. designating MOS switches 24a and 24b.

In FIG. 5, the drains of the P-channel MOS switch 24a and the N-channel MOS switch 24b are interconnected to each other and are connected to the coil 7, shown in FIG. 4. The source of the MOS switch 24a is applied with the supply voltage of +V, the source of the MOS switch 24b is applied with the source voltage of −V, and the gates of these MOS switches are supplied with the pulse signal as the carrier from the oscillator 20 (see FIG. 4). When the carrier is "H", the MOS switch 24a is turned on so that the voltage of +V is supplied to the coil 7. When the carrier is "L", the MOS switch 24b is turned on so that the voltage of −V is supplied to the coil 7.

In the case where data is to be read from the IC card 2 (see FIG. 1), the supply voltages of the selecting switch circuit 22 are fixed to either +V1 and −V1 or +V2 and −V2.

With such a selecting switch circuit, the amplitude of a high frequency signal is 2 V or twice as high as a supply voltage. Namely, it is possible to reduce the supply voltage to the minimum value required in comparison with the driver circuit constituted by a conventional linear amplifier. Also, it is possible to correspondingly reduce the size of the power supply circuit of the driver circuit. Further, since the high frequency signal can take a rectangular wave form, the rectifying/smoothing efficiency of the rectifying/smoothing circuit 12 (see FIG. 1) in the IC card 2 can be improved.

Figure 6:
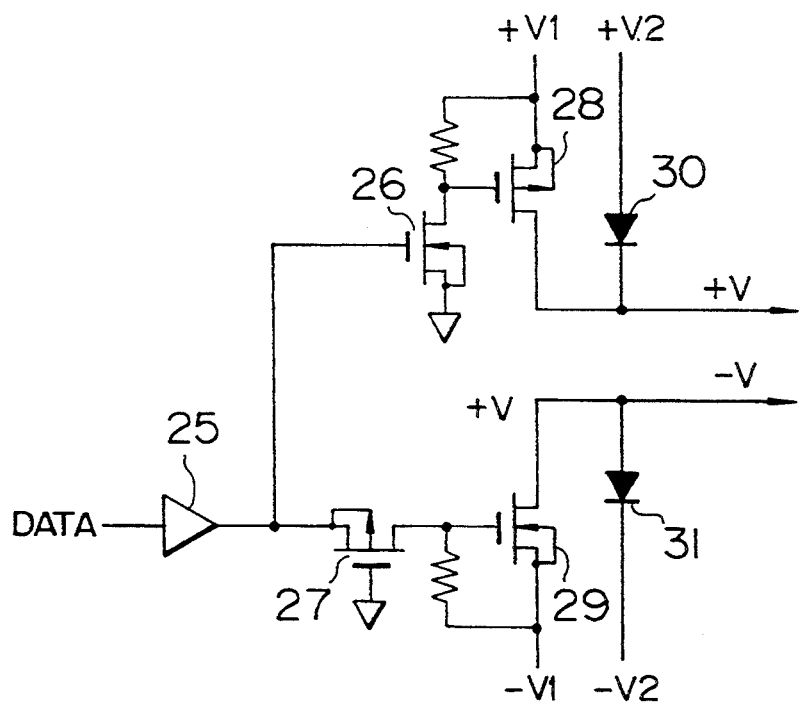
FIG. 6 is a circuit diagram showing a specific example of a power supply circuit shown in FIG. 4.

FIG. 6 is a circuit diagram showing a specific example of the power supply circuit 23 in FIG. 4.

In FIG. 6, data from the data source 21 (see FIG. 4) is supplied to MOS transistors 26 and 27 through a pre-driver circuit 25. The drain of the MOS transistor 26 is connected to the gate of a MOS switch 28 and the drain of the MOS transistor 27 is connected to the gate of a MOS switch 29. The source of the MOS switch 28 is applied with +V1 and the source of the MOS switch 29 is applied with −V1. The drain of the MOS switch 28 and the drain of the MOS switch 29 are respectively connected to the cathode of a diode 30 and the anode of a diode 31, and the anode of the diode 30 and the cathode of the diode 31 are respectively connected to +V2 and −V2. Herein, it is assumed that $|V1| > |V2|$.

Now, provided that "1" of data is inputted to the driver circuit 25, the MOS switches 28 and 29 are both turned on by the outputs of the MOS transistors 26 and 27. Thereby, +V1 is applied as a supply voltage of +V to the selecting switch circuit 22 (see FIG. 4) through the MOS switch 28 and −V1 is applied as a source voltage of −V to the selecting switch circuit 22 through the MOS switch 29. At this time, the diodes 30 and 31 are reverse biased and are therefore in turned-off conditions. On the other hand, when "0" of data is inputted to the driver circuit 25, the MOS switches 28 and 29 are both turned off. Thereby, +V2 and −V2 are applied as the source voltages of +V and −V to the selecting switch circuit 22 through the diodes 30 and 31, respectively.

Figure 7:
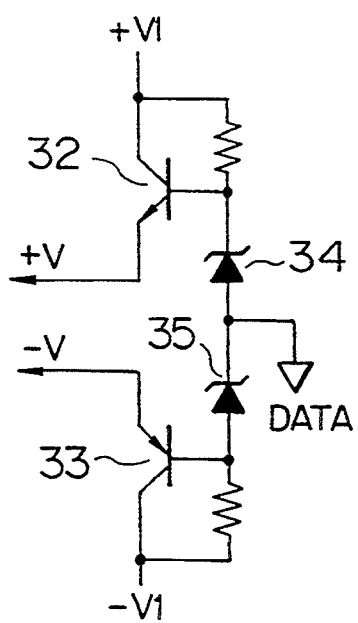
FIG. 7 is a circuit diagram showing an example of the power supply circuit shown in FIG. 4.

FIG. 7 is a circuit diagram showing another specific example of the power supply circuit 23 shown in FIG. 4.

In FIG. 7, the collector of an NPN transistor 32 is applied with +V1 and the collector of a PNP transistor 33 is applied with −V1. The emitter voltage of the transistor 32 and the emitter voltage of the transistor 33 are respectively applied as +V and −V to the selecting switch circuit 22 shown in FIG. 4. Data from the data source 21 (see FIG. 4) is supplied to the bases of the transistors 32 and 33 through Zener diodes 34 and 35.

When "1" of data is supplied, the base voltages of the transistors 32 and 33 become high and hence the emitter voltages of these transistors 32 and 33 are +V1 and −V1, respectively. On the other hand, when "0" of data is supplied, the base voltages of the transistors 32 and 33 become low and hence the emitter voltages of the transistors 32 and 33 are +V2 and −V2, respectively.

Figure 8:
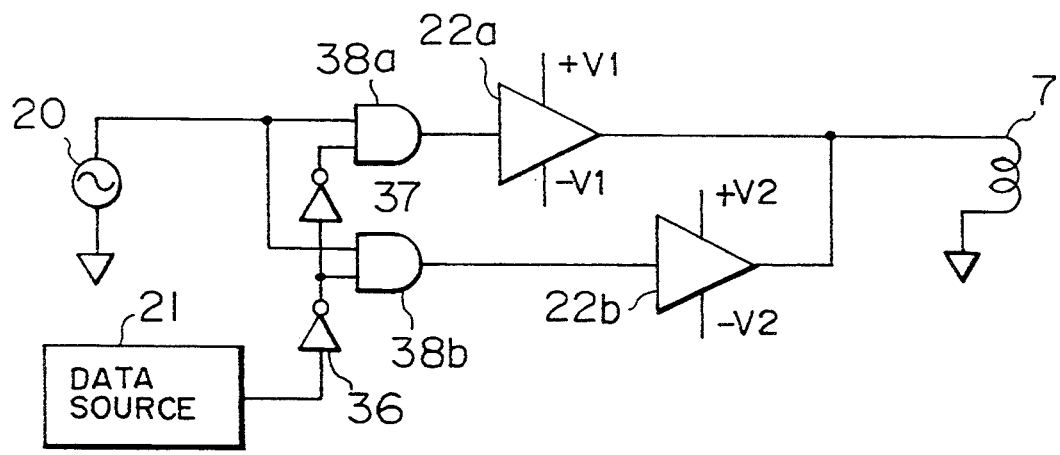
FIG. 8 is a diagram showing the construction of another specific example of the modulating circuit and the driver circuit shown in FIG. 1.

FIG. 8 is a diagram showing the construction of another specific example of the modulating circuit 5 and the driver circuit 6 shown in FIG. 1. There is seen numeral 22a and 22b designate selecting switch circuits 22a and 22b, inverters 36 and 37, and AND gates 28a and 38b. Components in FIG. 8 corresponding to those shown in FIG. 4 are designated by the same reference numerals as those used in FIG. 4.

In FIG. 8, each of the selecting switch circuits 22a and 22b is similar to the selecting switch circuit 22 in FIG. 4 and may take a construction, as shown in FIG. 5. Supply voltages of the selecting circuit 22a are fixed to +V1 and −V1 and supply voltages of the selecting switch circuit 22b are fixed to +V2 and −V2.

Data outputted from the data source 21 is supplied to the AND gate 38b after inversion by the inverter 36 and is then supplied to the AND gate 38a after inversion by the inverter 37. These AND gates 38a, and 38b are also supplied with the carrier outputted from the oscillator circuit 20.

Now, provided that "1" of data is outputted from the data source 21 so that the AND gate 38a is turned on, the carrier is supplied through the AND gate 38a to the selecting switch circuit 22a. At this time, the AND gate 38b is turned off. Accordingly, a high frequency signal having an amplitude of 2V1 is supplied from the selecting circuit 22a to the coil 7. On the other hand, when "0" of data is outputted from the data source 21, the AND gate 38a is turned off and the AND gate 38b is turned on so that a high frequency signal having an amplitude of 2V2 is supplied from the selecting switch circuit 22b to the coil 7.

In the case where data is to be read from the card 2 (see FIG. 1), either one of the AND gates 38a and 38b is held in a turned-off condition.

As apparent from the foregoing, the present specific example too provides an effect similar to that obtained in the specific example shown in FIG. 4.

Figure 9:
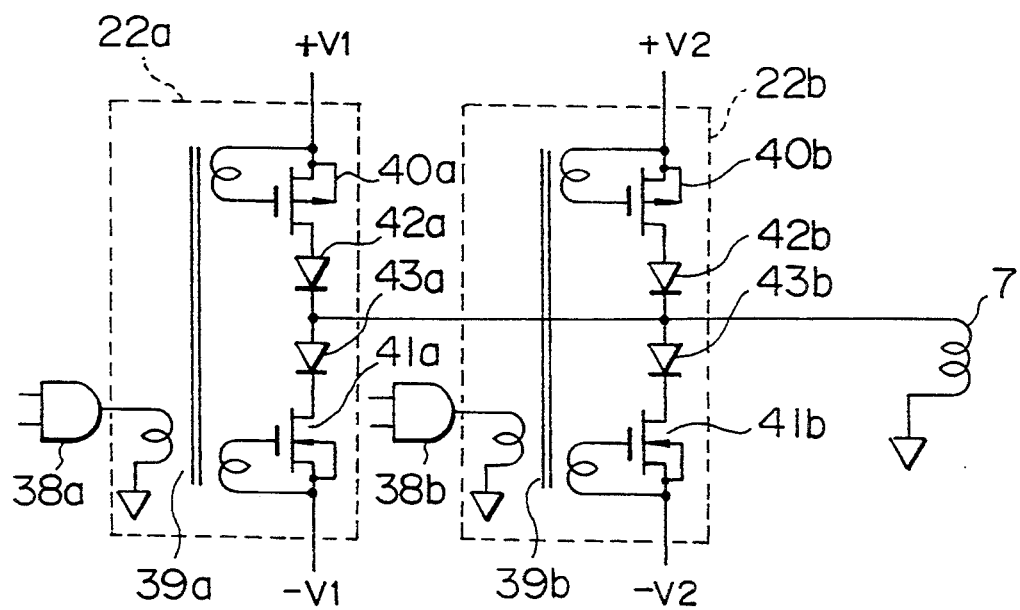
FIG. 9 is a circuit diagram showing an example of the circuit construction in the specific example shown in FIG. 8.

In the specific example shown in FIG. 8, each of the selecting switch circuits 22a and 22b has taken the construction shown in FIG. 5. Another example of construction is shown in FIG. 9. Components in FIG. 9 corresponding to those shown in FIG. 8 are designated by the same reference numerals as those used in FIG. 8.

In FIG. 9, when the AND gate 38a is turned on so that the carrier from the oscillator circuit 20 (see FIG. 4) is passed through the AND gate 38a, the carrier is supplied to MOS switches 40a and 41a through a pulse transformer 39a in the selecting switch circuit 22a so that the MOS switches 40a and 41a are alternately turned on and off at a period of the carrier. The source of the MOS switch 40a, and the source of the MOS switch 41a are respectively applied with +V1 and −V1, and the drains of the MOS switches 40a and 41a are connected to the coil 7 through diodes 42a and 43a, respectively. Accordingly, a high frequency signal having an amplitude of 2V1 is supplied to the coil 7 by alternately turning on and off the MOS switches 40a and 41a.

When the AND gate 38b is turned on so that the carrier from the oscillator circuit 20 (see FIG. 4) is passed through the AND gate 38b, the carrier is supplied to MOS switches 40b and 41b through a pulse transformer 39b in the selecting switch 22b so that the MOS switches 40b and 41b are alternately turned on and off at the period of the carrier. The source of the MOS switch 40b and the source of the MOS switch 41b are respectively applied with +V2 and −V2, and the drains of the MOS switches 40b and 41b are connected to the coil 7 through diodes 42b and 43b, respectively. Accordingly, a high frequency signal having an amplitude of 2V2 is supplied to the coil 7 by alternately turning on and off the MOS switches 40b and 41b.

Figure 10:
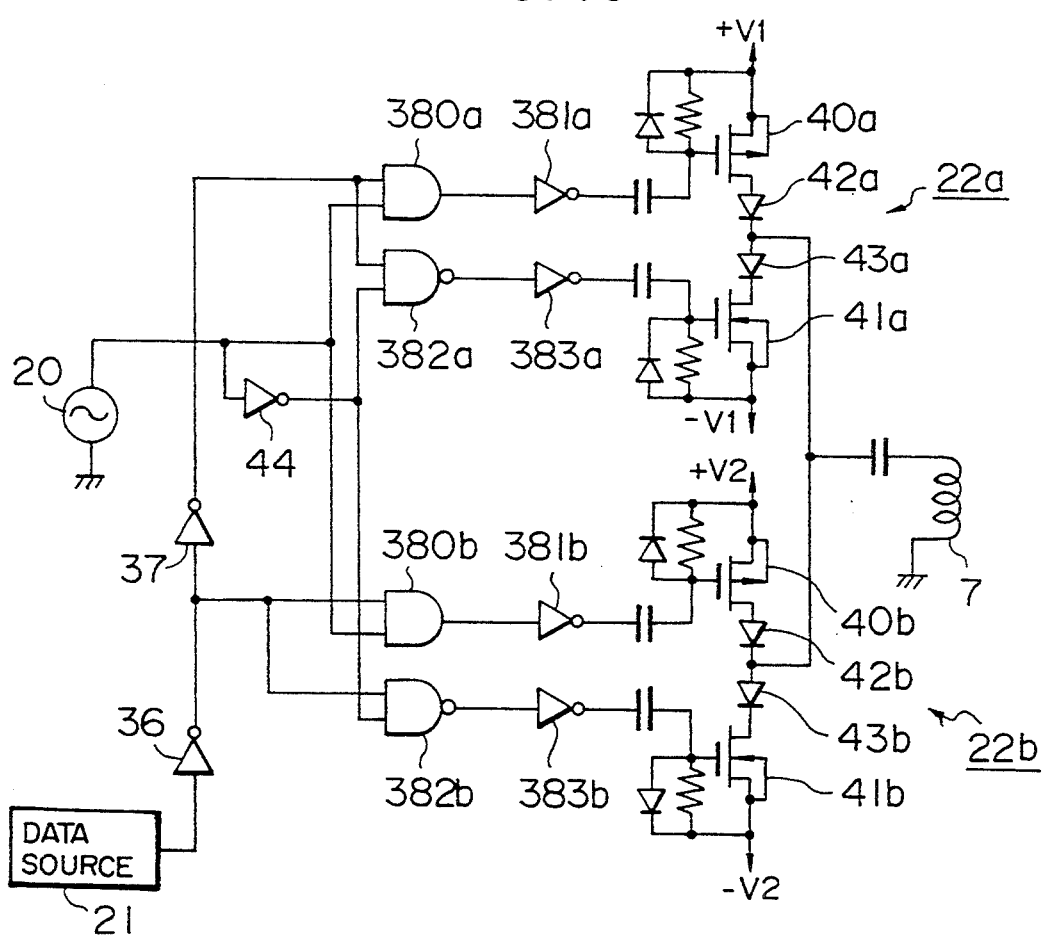
FIG. 10 is a further specific example of the modulating circuit and the driver circuit shown in FIG. 1.

FIG. 10 is a diagram showing a further specific example of the modulating circuit 5 and the driver circuit 6 shown in FIG. 1. There is seen AND gates 380a and 380b, inverters 381a, 381b, NAND gates 382a and 382b, and inverters 383a, 383b and 44 having a predriving function. Components in FIG. 10 corresponding to those shown in the foregoing figures are designated by the same reference numerals as those used in the foregoing figures.

In FIG. 10, when "1" of data is outputted from the data source 21, the AND gate 380a and the NAND gate 382a are turned on and the AND gate 380b and the NAND gate 382b are turned off. "H" (or a high level) of the carrier from the oscillator 20 is passed through the AND gate 380a, is inverted by the inverter 381a and is then supplied to the selecting switch circuit 22a to turn the MOS switch 40a on. On the other hand, "L" (or a low level) of the carrier is passed through the NAND gate 382a after inversion by the inverter 44, is inverted by the inverter 383a and is then supplied to the selecting switch circuit 22a to turn the MOS switch 41a on.

Accordingly, when "1" of data is outputted from the data source 21, the MOS switches 40a and 41a in the selecting switch circuit 22a are alternately turned on and off by the carrier from the oscillator 20 so that a high frequency signal having an amplitude of 2V1 is supplied to the coil 7.

Similarly, when "0" of data is outputted from the data source 21, the AND gate 380b and the NAND gate 382b are turned on. Therefore, "H" of the carrier from the oscillator 20 is supplied through the AND gate 380b and the inverter 381b to the selecting switch circuit 22b to turn the MOS switch 40b on. On the other hand, "L" of the carrier is supplied through the NAND gate 382b and the inverter 383b to the selecting switch circuit 22b to turn the MOS switch 41b on.

Accordingly, when "0" of data is outputted from the data source 21, the MOS switches 40b and 41b in the selecting switch circuit 22b are alternately turned on and off by the carrier from the oscillator 20 so that a high frequency signal having an amplitude of 2V2 is supplied to the coil 7.

Figure 11:
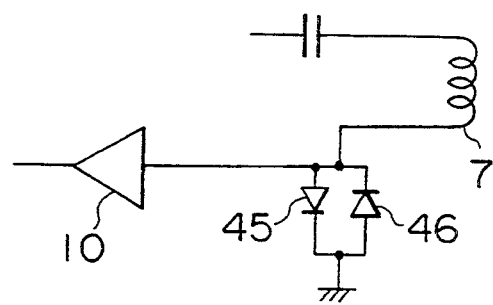
FIG. 11 is a circuit diagram showing an alternative to coil current detecting means shown in FIG. 1.

The means for detecting a current, which flows through the coil 7, is not limited to the disclosed means so long as a voltage drop is sufficiently small for a variation of the coil current. For example, there can be used a construction, as shown in FIG. 11, in which two diodes 45 and 46 connected in parallel with each other and with reverse polarities are connected between one end of the coil 7 and the ground and a coil current is supplied to the comparator 10 from the junction of the diodes 45 and 46 and the coil 7. Since a voltage drop between opposite ends of the diodes 45 and 46 is sufficiently small as compared with the amplitude of a high frequency voltage outputted from the driver circuit 6 (see FIG. 1), the high frequency voltage applied to the coil 7 becomes constant.

Next, another embodiment of the present invention will be explained in reference to FIGS. 12 to 19.

Figure 12:
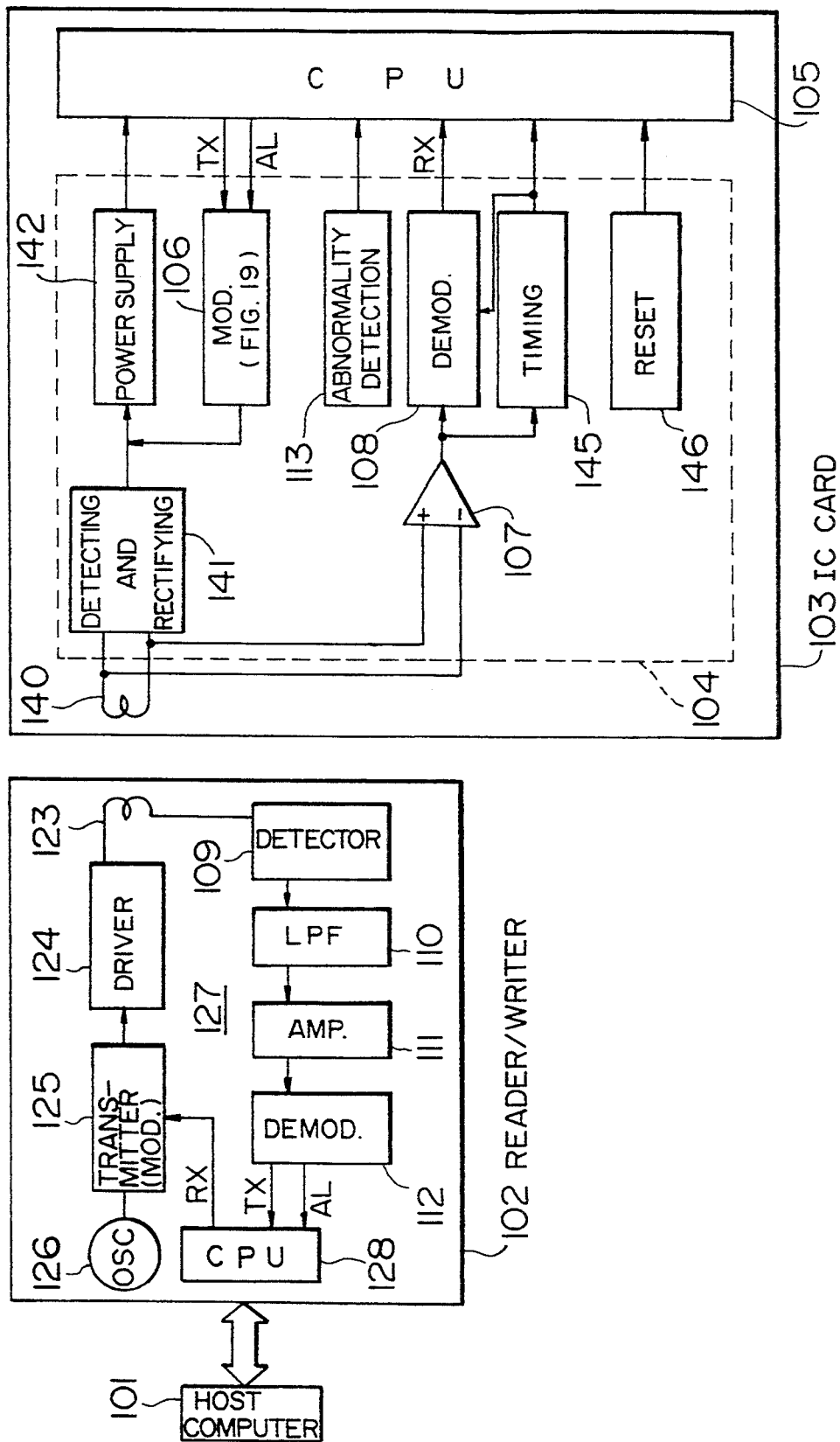
FIG. 12 is a block diagram showing an embodiment of a non-contact IC card system according to the present invention.

FIG. 12 is a block diagram showing an embodiment of a non-contact IC card system according to the present invention. In a transceiver circuit section 104 of an IC card 103, there is seen a modulation circuit 106, a comparator 107, a demodulating circuit 108, and an abnormality detecting circuit 113. In a reader/writer 102, there is seen a detector circuit 109, an LPF (low pass filter) 110, an amplifier 111, a demodulating circuit 112.

Figure 13:
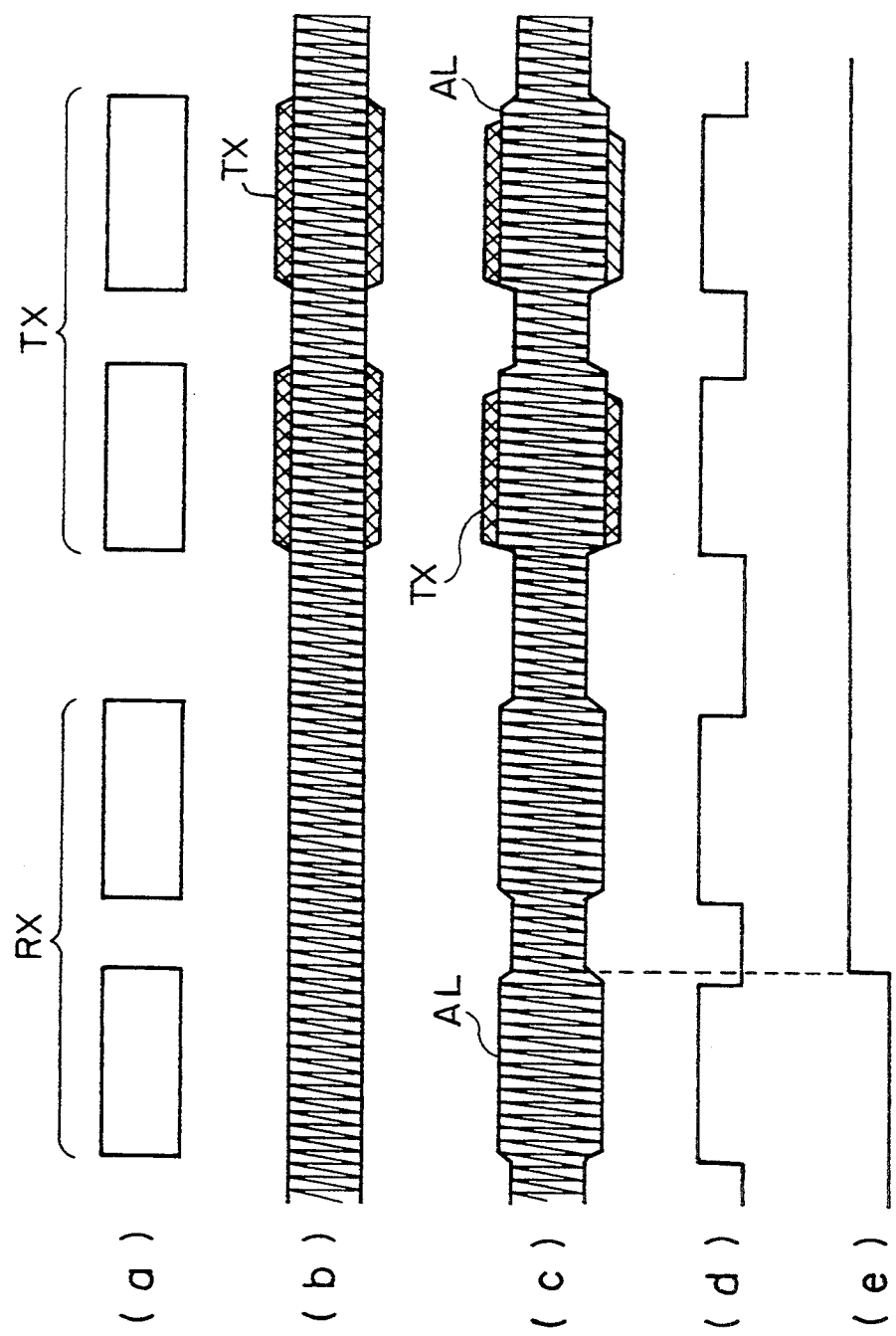
FIG. 13 is a timing chart illustrating the operation of transmission of data and abnormality detection information in the embodiment shown in FIG. 12 by use of waveforms (a) to (e)

In FIG. 12, when data is sent from the reader/writer 102 to the IC card 103, a transmitted circuit 125 modulates a carrier from an oscillator circuit 126 by data RX from a CPU 128 which includes "1" and "0" bits. The modulation is made by a modulation system such as frequency modulation or phase modulation in which the amplitude is fixed. Accordingly, in connection with the data RX shown by a waveform (a) in FIG. 13, a modulated high frequency voltage having a fixed amplitude as shown by a waveform (b) in FIG. 13 is applied from a driver 124 to a coil 123 and is transmitted to the IC card 103 through the coil 123 and a coil 140. In the IC card 103, a supply voltage is generated from the modulated high frequency voltage by a power supply circuit 142. Also, the modulated high frequency voltage from the coil 140 is waveform-shaped by the comparator 107 and is thereafter supplied to the demodulating circuit 108 and a timing circuit 145 which in turn generates a clock signal. The clock signal is supplied to a CPU 105 and the demodulating circuit 108 which in turn demodulates data RX of "1" and "0" bits from the waveform-shaped, modulated high frequency voltage. The data RX is processed by the CPU 105 and is then stored in a memory which is not shown.

In the case where data is sent from the IC card 103 to the reader/writer 102, data TX including "1" and "0" is sent from the CPU 105 to the modulating circuit 106. In connection with the data TX shown by a waveform (a) in FIG. 13, a high frequency current flowing through the coil 123 is amplitude-modulated by the modulating circuit 106, as shown by a waveform (b) in FIG. 13.

A receiver circuit 127 is composed of the detector circuit 109, the LPF 110, the amplifier 111 and the demodulating circuit 112 and demodulates a high frequency current flowing through the coil 123 when it is amplitude-modulated. In this case, since the high frequency current is amplitude-modulated by the data TX from the IC card 103, the data TX is demodulated and taken into the CPU 128.

In accordance with a command from a host computer 101, the CPU 128 takes in the output of the receiver circuit 127 in the period of data transmission between the reader/writer 102 and the IC card 103. But, in the case where data is only transmitted from the reader/writer 102 to the IC card 103 the CPU 128 serves to prevent the receiver circuit 127 from generating an output because of data transmitted from the reader/writer side though a high frequency current flowing through the coil 123 changes corresponding to the data transmitted. The change of the high frequency current is not shown in the waveform (b) in FIG. 13.

If there is any abnormality in the IC card 103, the abnormality detecting circuit 113 detects the abnormality. When the abnormality is detected by the abnormality detecting circuit 113, the CPU 105 supplies abnormality detection information AL to the modulating circuit 106 in synchronism with a period of time when data RX is supplied from the demodulating circuit 108 and a period of time when data TX is supplied to the modulating circuit 106 (that is, the period of data transmission between the reader/writer 102 and the IC card 103), as shown by a waveform (d) in FIG. 13. In the reader/writer 102, a high frequency current flowing through the coil 123 is amplitude-modulated by the abnormality detection information AL, similarly to the case where the data TX is supplied from the CPU 105. This is shown by a waveform (c) in FIG. 13 in connection with the data RX and TX shown by the waveform (a) in FIG. 13. When data is transmitted from the reader/writer 102 to the IC card 103, the high frequency current flowing through the coil 123 is amplitude-modulated by only the abnormality detection information AL, as shown in a left portion of the waveform (c) in FIG. 13. When data is transmitted from the IC card 103 to the reader/writer 102, the high frequency current is amplitude-modulated by the abnormality detection information AL and the data TX, as shown in a right portion of the waveform (c) in FIG. 13.

The receiver circuit 127 in the reader/writer 102 outputs only the abnormality detection information AL when the data RX is transmitted from the reader/writer 102 to the IC card 103 and demodulates and outputs the abnormality detection information AL and the data TX when the data TX is transmitted from the IC card 103 to the reader/writer 102. A waveform (e) in FIG. 13 shows the abnormality detection information AL outputted from the receiver circuit 127.

As described above, in the present embodiment, the abnormality detection information AL is transmitted in synchronism with the period of data transmission between the reader/writer 102 and the IC card 103 and the abnormality detection information AL can be detected surely by the reader/writer 102. The abnormality detection information AL is not transmitted in a period other than the data transmission period. Therefore, a power consumption is greatly reduced as compared with the usual system in which abnormality detection information is continually transmitted.

The CPU in the reader/writer takes in the output of the receiver circuit in accordance with a command from the host computer. However, with the usual half-duplex communication function, it is not possible to take in second data such as the above-mentioned abnormality detection information during data transmission.

To the contrary, in the present embodiment, not only a power consumption caused by useless transmission of abnormality detection information is avoided, as described above, but also the CPU 128 takes in the output of the receiver circuit 127 even in the case where data is transmitted from the reader/writer 102 to the IC card 103. Therefore, the detection of abnormality in the IC card 103 becomes possible even in such a case.

Figure 14:
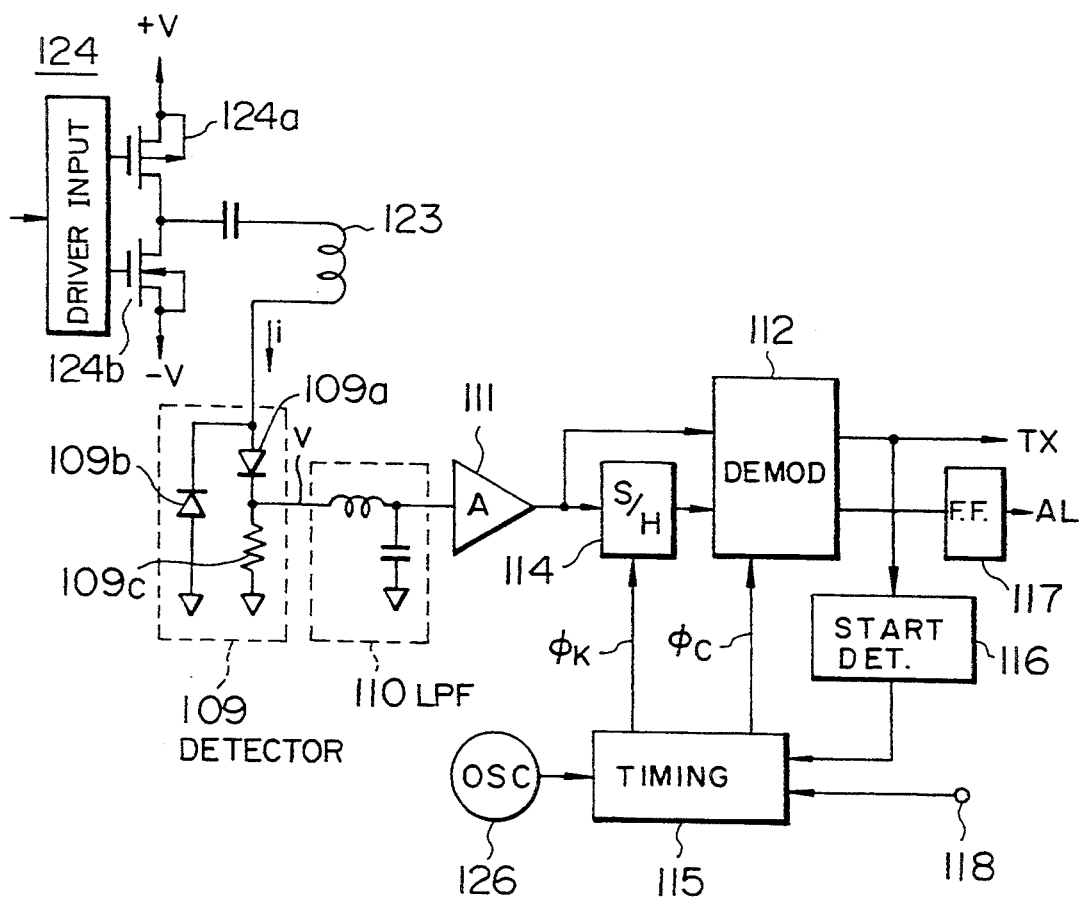
FIG. 14 is a diagram showing the construction of a specific example of a receiver circuit of a reader/writer in the system shown in FIG. 12.

FIG. 14 is a block diagram showing the details of the receiver circuit 127 shown in FIG. 12. There is seen diodes 109a and 109b, a resistor 109c, an S/H (sample/hold) circuit 114, a timing circuit 115, a start bit detecting circuit 116, a flip-flop circuit 117, an input terminal 118, and switching transistors 124a and 124b. Components in FIG. 14 corresponding to those shown in FIG. 12 are designated by the same reference numerals as those used in FIG. 12.

In FIG. 14, the driver 124 outputs a high frequency current i to the coil 123 by alternately turning on and off the switching transistors 124a and 124b. The switching transistors 124a and 124b are turned on and off by the output signal of the transistor circuit 125 shown in FIG. 12.

The detector circuit 109 includes of the diodes 109a and 109b and the resistor 109c. When the switching transistor 124a of the driver 124 is turned on, a current i flows in a path of switching transistor 124a→ coil 124→diode 109a→resistor 109c. When the switching transistor 124b is turned on, a current i flows in a path of diode 109b→coil 123→switching transistor 124b. A voltage v produced at the resistor 109c is taken in as a detection output voltage by the detector circuit 109. Accordingly, the detection output voltage v is obtained as a voltage when the high frequency current i takes one of opposite polarities.

Figure 15:
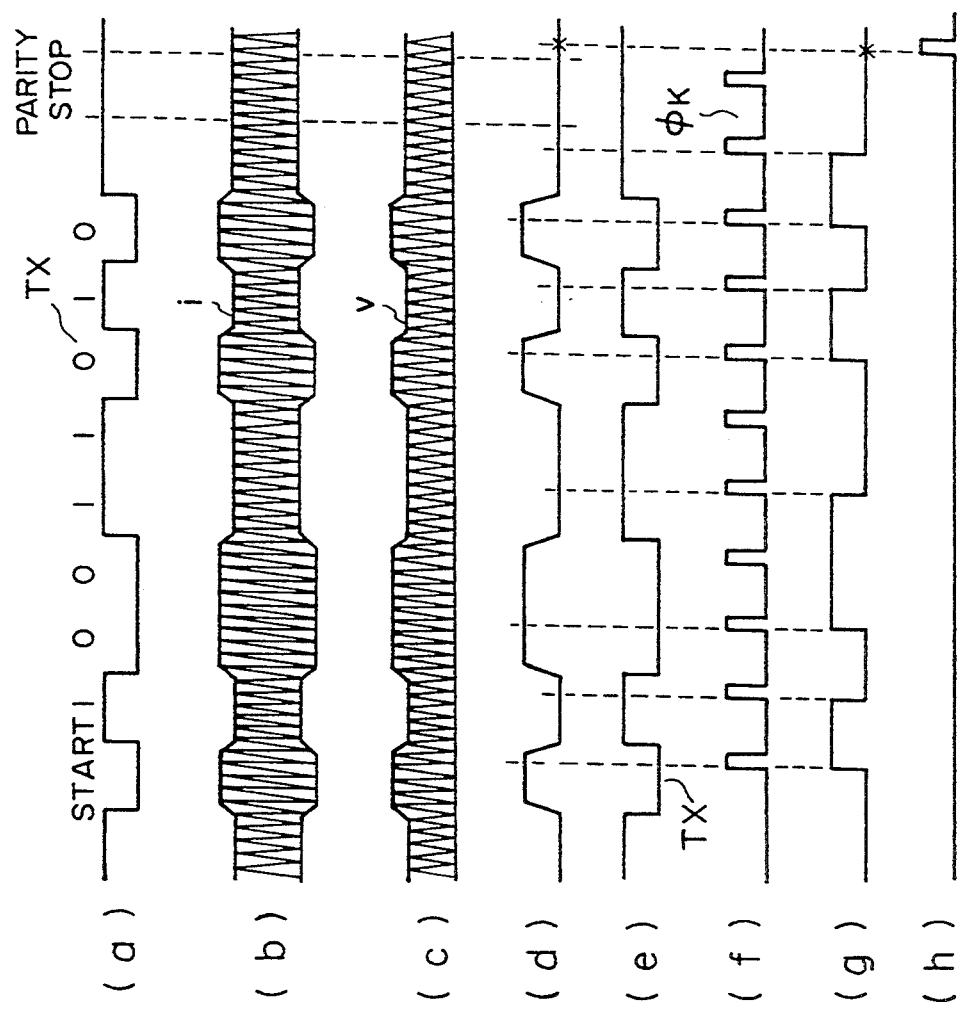
FIG. 15 is a timing chart illustrating the operation of the specific example shown in FIG. 14 by use of waveforms (a) to (h)
Figure 16:
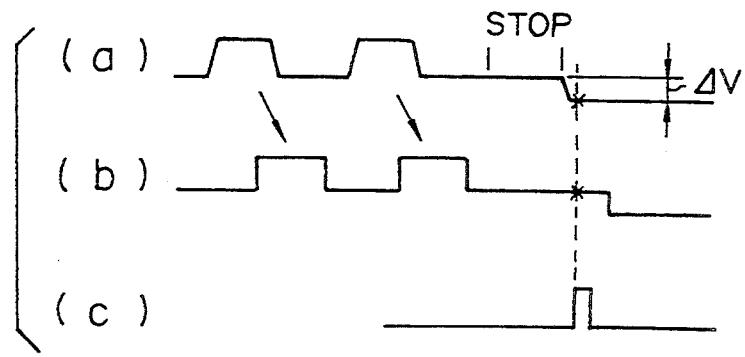
FIG. 16 is a timing chart illustrating the operation of extraction of abnormality detection information in the specific example shown in FIG. 14 by use of waveforms (a) to (c)

In the period of data transmission from the IC card 103 to the reader/writer 102, the high frequency current i for data TX shown by a waveform (a) in FIG. 15 is amplitude-modulated by the data TX, as shown by a waveform (h) in FIG. 15. Herein, it is assumed that the high frequency signal i takes a larger amplitude for the "0" bit of the data TX and holds the original amplitude for the "1" bit of the data TX.

Each of the data RX and TX is composed of a START bit including one bit, data including eight bits, a parity including one bit and a STOP bit including one bit. The START bit is "0" and the STOP bit is "1". A waveform (c) in FIG. 15 shows the detection output voltage v.

The resistance value of the resistor 109c is set to the order of the ON resistance of the switching transistor 124a or 124b. Therefore, the resistor 109c has almost no influence on the waveform of the high frequency current i.

The detection output voltage v is filtered by the LPF 110 and is amplified by the amplifier 111, thereby obtaining a signal, as shown by a waveform (d) in FIG. 15, which has a level corresponding to each bit of the data TX shown by the waveform (a) in FIG. 15. This signal is supplied to the demodulating circuit 112 and is demodulated thereby into the original data TX, as shown by a waveform (e) in FIG. 15.

The data TX demodulated is also supplied to the start bit detecting circuit 116 which in turn detects the START bit from the first edge. The timing circuit 115 is reset by the START bit pulse and counts the carrier from the oscillator circuit 126 to generate a sampling clock $\phi_K$ for each bit of the output signal of the amplifier 111 as shown by the waveform (d) in FIG. 15. The S/H circuit 114 samples and holds the output signal of the amplifier by the sampling clock $\phi_K$ and outputs a signal (see a waveform (g) in FIG. 15) delayed from the output signal of the amplifier 111 by about one bit. The delayed signal is supplied to the demodulating circuit 112.

Also, the timing circuit 115 generates a comparison timing clock $\phi_C$ at a timing immediately after the STOP bit in the output signal of the amplifier 111 (see the waveform (d) in FIG. 15). The demodulating circuit 112 compares the output signal of the amplifier 111 and an output signal of the S/H circuit 114 at a timing of the comparison timing pulse $\phi_C$. In this case, the demodulating circuit 112 judges abnormality detection information AL as being absent since a level of the output signal of the amplifier 111 (see the waveform (d) in FIG. 15) at the STOP bit and a level thereof immediately after the STOP bit are both "L" or equal to each other and hence the levels of the signals shown by the waveforms (d) and (g) in FIG. 15 at the timing of the comparison timing clock $\phi_C$ are equal to each other.

The above concerns the case where only the data TX is transmitted from the IC card 103 to the reader/writer 102. In the case where the data TX and the abnormality detection information AL are simultaneously transmitted, the high frequency current i (see FIG. 14) is amplitude-modulated also by the abnormality detection information AL and hence a level of the output signal of the amplifier 111 in the STOP bit period is different from a level thereof immediately after the STOP bit period by ΔV, as shown by a waveform (a) in FIG. 16. Thus, the output signal of the amplifier 111 and the output signal of the S/H circuit 114 (see a waveform (b) in FIG. 16) have a difference of ΔV in level therebetween at the timing of the comparison timing clock $\phi_C$ (see a waveform (c) in FIG. 16). When there is such a difference in level, the demodulating circuit 112 judges abnormality detection information AL as being present and sends a pulse to the flip-flop circuit 117 to trigger the same. Thereby, an output of the flip-flop circuit 117 becomes "H", as shown in FIG. 13.

Even in the case where abnormality detection information AL is transmitted during transmission of data RX from the reader/writer 102 to the IC card 103, the abnormality detection information AL can be extracted similarly since the high frequency current i is amplitude-modulated by the abnormality detection information AL. In this case, however, the data RX is not demodulated by the demodulating circuit 112. Thereby, the CPU 128 (see FIG. 12) in the reader/writer 102 can know the start of transmission of the data RX and supplies a pulse synchronous with the START bit of the data RX to the timing circuit 115 from the input terminal 118.

In this manner, it is possible to extract the abnormality detection information AL which is sent from the IC card 103 simultaneously with the data RX or TX. Further, since the presence/absence of abnormality detection information AL is judged in FIG. 14 in accordance with whether a level at the STOP bit of data and a level immediately after the STOP bit are equal or different, the judgement of the presence/absence of abnormality detection information AL is surely made even unless the amplitude of the high frequency current i becomes constant, for example, because of a variation of the condition of coupling between the coils 123 and 140.

Figure 17:
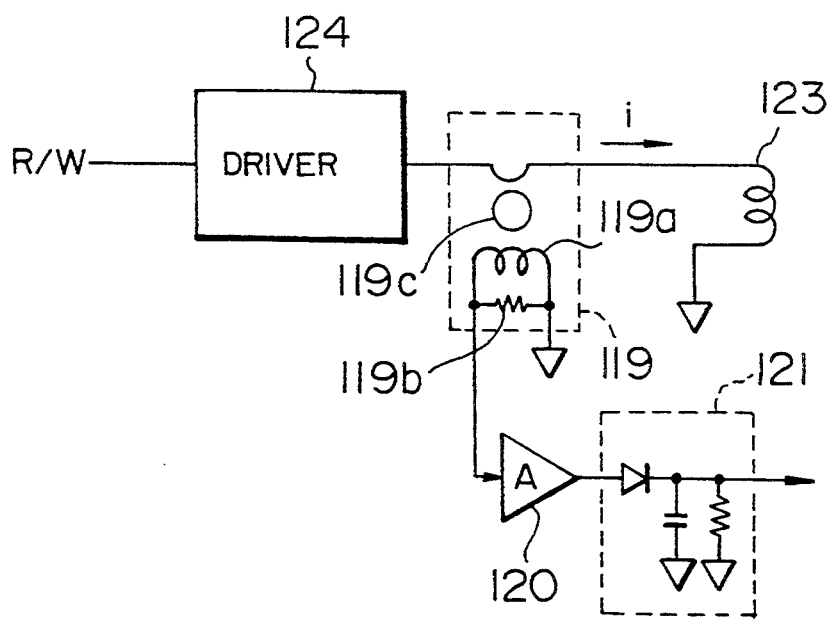
FIG. 17 is a diagram showing the construction of another specific example of the receiver circuit of the reader/writer shown in FIG. 12.

FIG. 17 is a block diagram showing a main part of another specific example of the receiver circuit 127 in FIG. 12. There is seen a current transformer 119, a detecting coil 119a, a resistor 119b, and an envelope detecting amplifier 120, and an envelope detecting circuit 121. Components in FIG. 17 corresponding to those shown in the foregoing figures are designated by the same reference numerals as those used in the foregoing figures.

In FIG. 17, the current transformer 119 for detecting a current which flows through the coil 123 (or a coil current), is composed of the magnetic core 119c, the detecting coil 119a and the resistor 119b and is provided in series with the coil 123. The magnetic core 119c is, for example, a ring-like magnetic core and an electric wire passing through a central hole of the magnetic core is connected to the coil 123. The detecting coil 119a is wounded N times (N: an integer not smaller than 1) around the magnetic core 119c and the resistor 119b for converting a detection current of the detecting coil 119a into a voltage is connected between opposite ends of the detecting coil 119a, thereby forming a so-called current transformer. A high frequency current (see a waveform (a) in FIG. 18) flowing through the coil 123 is detected by the detecting coil 119a, is converted by the resistor 119b into a high frequency voltage, is thereafter amplified by the amplifier 120 and is then subjected to envelope detection and waveform shaping by the envelope detecting circuit 121, as shown by a waveform (b) in FIG. 18, thereby extracting a signal which includes data TX and abnormality detection information AL. This signal is sent to the demodulating circuit 112 and the S/H circuit 114, as shown in FIG. 14.

The input impedance of the current transformer 119 including the magnetic core 119c, the detecting coil 119a and the resistor 119b is sufficiently small and a voltage drop at the current transformer is sufficiently small irrespective of a current which flows therethrough. Accordingly, the amplitude of a high frequency current applied to the coil 123 is kept approximately constant.

In this manner, an effect similar to that in the specific example shown in FIG. 14 is obtained in the present specific example too.

Figure 18:
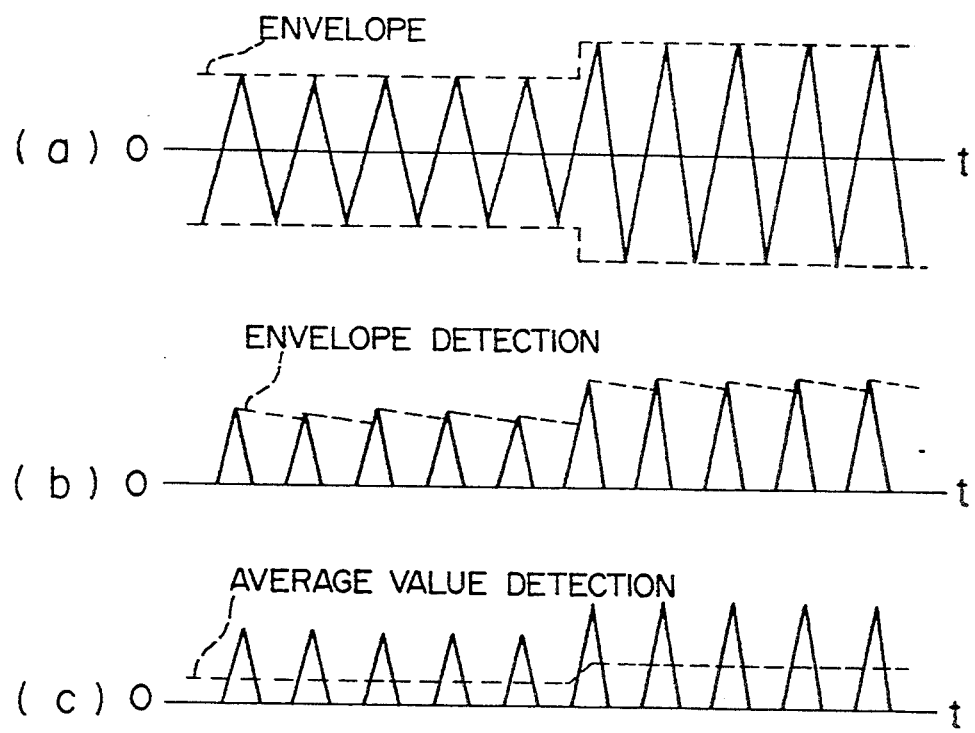
FIG. 18 is a diagram illustrating the operation of the specific example shown in FIG. 17 by use of signal waveforms (a) to (c)

In FIG. 17, a diode detector circuit and a filter are used in lieu of the envelope detecting circuit 121 to detect a center level, as shown by a waveform (c) in FIG. 18.

Figure 19:
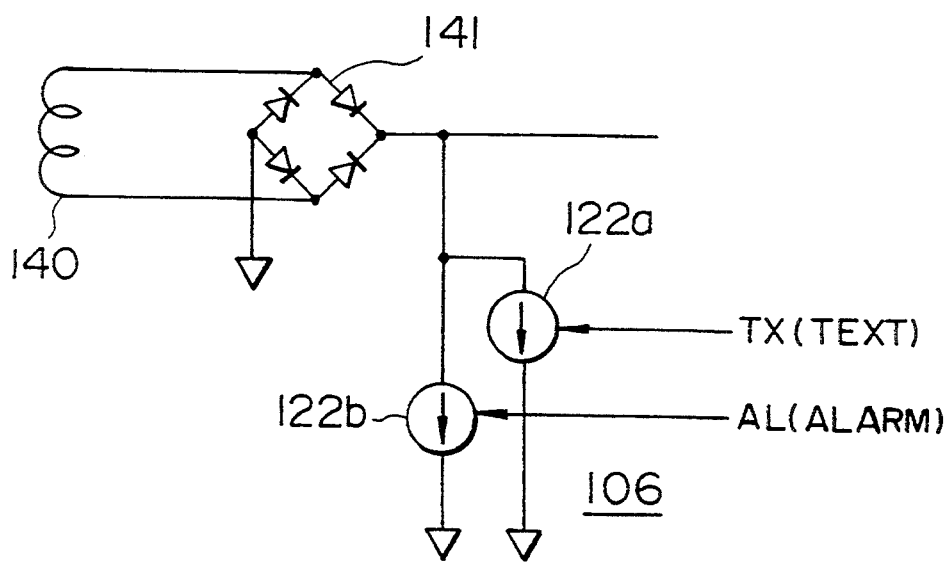
FIG. 19 is a diagram showing the construction of a specific example of a modulating circuit in a non-contact IC card shown in FIG. 12.

FIG. 19 shows an example of the modulating circuit 106 shown in FIG. 12. The modulating circuit 106 includes variable current sources 122a and 122b. The current value of the variable current source 122a is controlled by data TX from the CPU 105 (see FIG. 12) and the current value of the variable current source 122b is controlled by abnormality detection information AL from the CPU 105.

The variable current source 122a is held at a zero current when the data TX is not supplied. The variable current source 122b is held at a predetermined current value on in the period of abnormality detection information AL. The variation in the current values of the variable current source 122a or 122b is detected as an amplitude change of a high frequency current flowing through the coil 123 shown in FIG. 12.

Next, a further embodiment of the present invention will be explained in reference to FIGS. 20 to 25.

Figure 20:
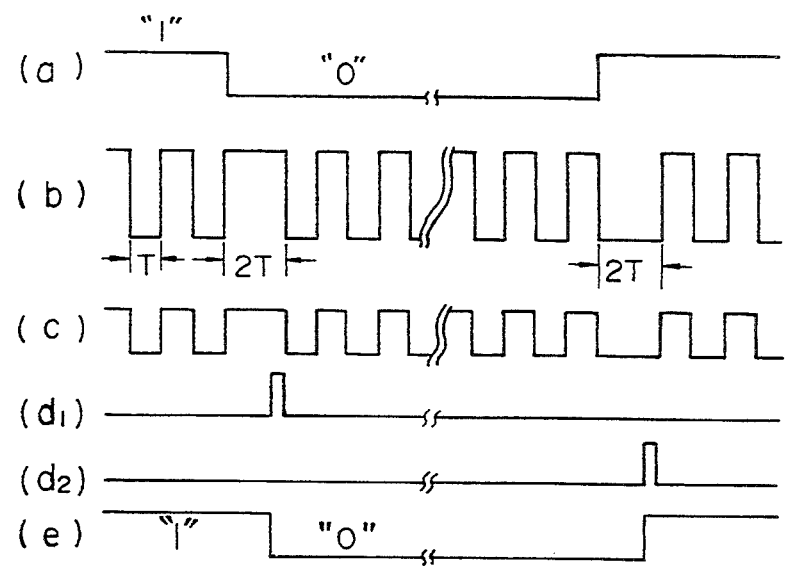
FIG. 20 is a timing chart for explaining another embodiment of a data transmission system according to the present invention by use of operating waveform (a) to (e)

FIG. 20 is a timing chart for explaining an embodiment of a data transmission system according to the present invention.

Explanation will now be made of the case where this embodiment is applied to the IC card system shown in FIG. 1. A modulated carrier signal shown by a waveform (b) in FIG. 20 is outputted from the modulating circuit 5 in connection with digital data (see a waveform (a) in FIG. 20) outputted from the data processor 4. Assume that a ½ period before modulation is T. In the modulated carrier signal, the ½ period at the boundary between "1" and "0" bits of the digital data (or the waveform (a) in FIG. 20) is expanded to twice as long as the ½ period before modulation, that is, 2T. In the shown example, the ½ period for a half cycle from such a boundary of the digital data is expanded to 2T. In other portions of the modulated carrier signal, the ½ period is maintained to the length T before modulation.

The modulated carrier signal shown by the waveform (b) in FIG. 20 is supplied to the receiver circuit 14, thereby waveform-shaping the modulated carrier signal. The waveform-shaped, modulated carrier signal is shown by a waveform (c) in FIG. 20. For simplification Of illustration of the waveform, the waveform (b) is shown as if the waveform (b) was directly waveform-shaped.

Next, the time length of each ½ period of the modulated carrier signal shown by the waveform (c) in FIG. 20 is detected to generate pulses as shown by waveforms ($d_1$), ($d_2$) in FIG. 20 (hereinafter referred to as edge pulses). As shown by a waveform (e) in FIG. 20, there is produced data the level of which is inverted when the edge pulse is generated. This data is digital data demodulated from the modulated carrier signal (see the waveform (b) in FIG. 20).

In the case where digital data is transmitted as a carrier signal as shown by the waveform (b) in FIG. 20, a predetermined bit of "0" or "1" is transmitted as an initial bit and a data demodulating circuit included in the receiver circuit 14 sets an initial state in accordance with the initial bit. Thereby, correct digital data is demodulated always.

Figure 21:
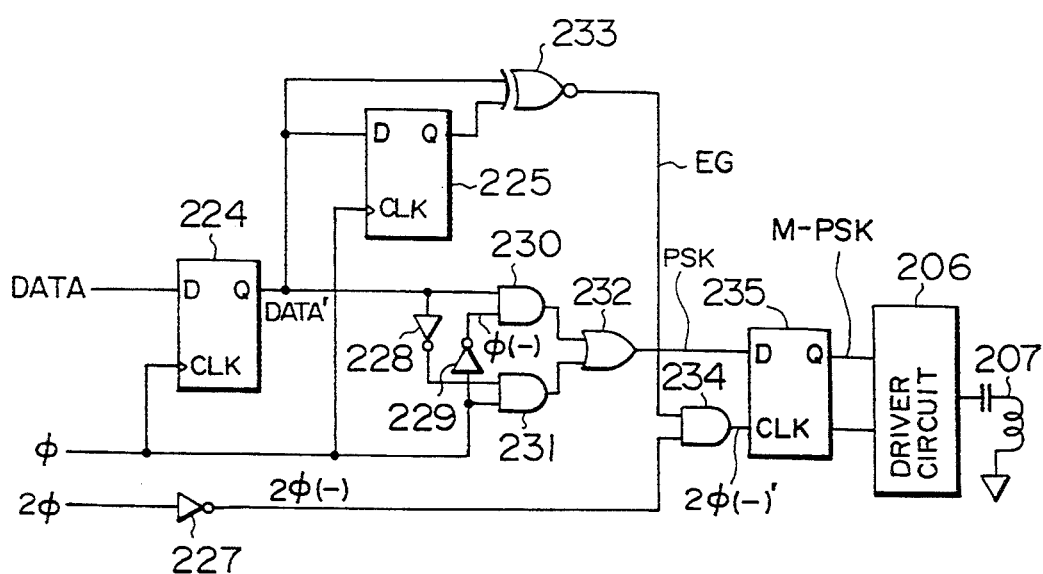
FIG. 21 is a block diagram showing a specific example of a modulating circuit for the embodiment shown in FIG. 20.
Figure 22:
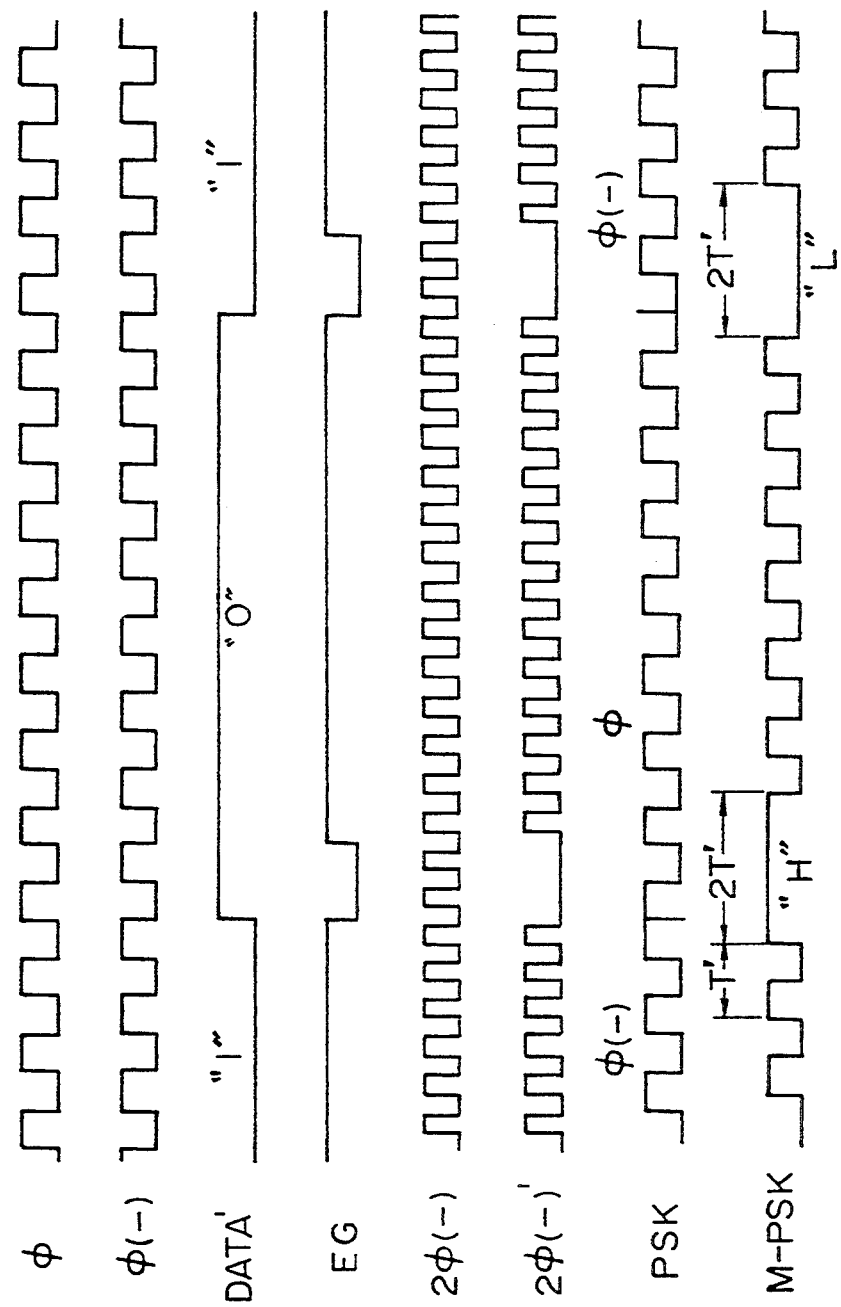
FIG. 22 is a diagram showing the waveforms of signals at several parts in FIG. 21.

FIG. 21 is a block diagram showing a specific example of the modulating circuit in the reader/writer for generating such a modulated carrier signal. There is seen D-FF's (delayed flip-flop circuits) 224 and 225, inverters 227 to 229, AND gates 230 and 231, an OR circuit 232, an exclusive OR (EX-OR) circuit 233, an AND gate 234, and a D-FF 235. FIG. 22 shows the waveforms of signals at several parts in FIG. 21. Reference symbols for signals shown in FIG. 22 correspond to those shown in FIG. 21.

The specific example shown in FIG. 21 is used as the modulating circuit 5 shown in FIG. 1. In FIG. 21, digital data DATA from the data processor 4 (see FIG. 1) is supplied to the D input of the D-FF 224 and is latched by the rise edge of a clock signal $\phi$ of a period T' from a clock generating circuit included in the CPU 4. As shown in FIG. 22, digital data DATA' synchronized in phase with the clock signal $\phi$ is obtained.

The digital data DATA' from the D-FF 224 is latched by the fall edge of the clock signal $\phi$ in the D-FF 225. Thereby, digital data delayed from the digital data DATA' by a time corresponding to one period of the clock signal $\phi$ is outputted from the D-FF 225. This delayed digital data and the digital data DATA' are supplied to the EX-OR circuit 233. Thereby, an edge pulse EG having an "L" level for a time corresponding to one period of the clock signal φ is obtained from the EX-OR circuit 233 at every edge of the digital data DATA'.

The digital data DATA' outputted from the D-FF 224 is also supplied to the AND gate 230 on one hand and is supplied to the AND gate after inversion by the inverter 228 on the other hand. Also, the clock pulse φ is supplied to the AND gate 231 and is supplied to the AND gate 230 after inversion by the inverter 229 on the other hand. Accordingly, in the AND gate 230, the digital data DATA' is sampled by an inverted version of the clock signal φ or the inverted clock signal φ(−). In the AND gate 231, an inverted version of the digital data DATA' is sampled by the clock signal φ. Outputs of the AND gates 230 and 231 are supplied to the OR circuit 232.

Provided that the "H" and "L" periods of the digital data DATA' correspond to "0" and "1" bits, respectively, the AND gate 230 samples the "0" bit of the digital data DATA' by the inverted clock signal φ(−) and the AND gate 231 samples the "1" bit of the digital data DATA' by the clock signal φ. Therefore, the OR circuit 232 outputs a modulated signal having a phase difference of 180° between the "0" and "1" bits of the digital data DATA'. The point of time when the phase is inverted is a boundary between the "0" and "1" bits of the digital data DATA'. Accordingly, the output signal of the OR circuit 232 is a so-called PSK (phase shift keying) signal.

The clock generating circuit further supplies a clock signal 2φ which has a frequency twice as high as the clock signal φ. The clock signal 2φ has a rise edge synchronized with the fall edge of the clock signal φ and is inverted by the inverter 227. The inverted clock signal 2φ(−) outputted from the inverter 227 is supplied to the AND gate 234 together with the edge pulse EG from the EX-OR circuit 233 to eliminate a portion of the inverted clock signal 2φ(−) in the pulse duration of the edge pulse EG.

The D-FF 235 receives the PSK signal from the OR circuit 232 at the D input and samples and holds it by the rise edge of a clock signal 2φ(−)' from the AND gate 234. Thereby, a modulated carrier signal (M-PSK) explained in conjunction with FIG. 20 is obtained from the Q terminal of the D-FF 235. This signal is transmitted to the IC card through the driver circuit 206 and the coupling coil 207.

An inverted version of the modulated carrier signal M-PSK is outputted from the Q(−) terminal of the D-FF 235 and is supplied to the driver circuit 206 together with the modulated carrier signal M-PSK from the Q terminal. Individual switches in the driver circuit 206 are turned on and off by those signals so that a current of the modulated carrier signal M-PSK flows through the coil 207.

Next, explanation will be made of the demodulation of the modulated carrier signal shown in FIG. 22.

Figure 23:
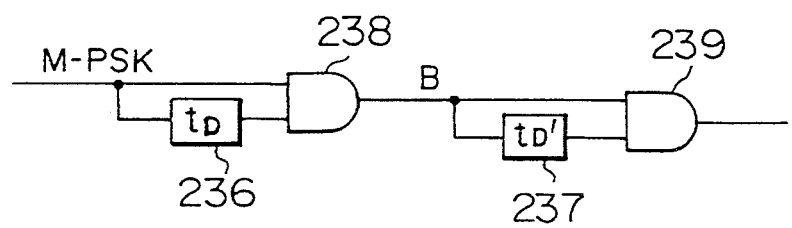
FIG. 23 is a circuit diagram showing the construction of a specific example of a demodulating circuit for the embodiment shown in FIG. 12.

FIG. 23 is a circuit diagram showing a part of a specific example of the demodulating circuit included in the receiver circuit 14 shown in FIG. 1 including delay circuits 236 and 237, and AND gates 238 and 239.

In the example shown in FIG. 23, two circuits each including a delay circuit and an AND gate are connected in series with each other. The modulated carrier signal M-PSK shown in FIG. 22 is supplied to the AND gate 238 on one hand and is delayed by $t_D$ in the delay circuit 236 and thereafter supplied to the AND gate 238 on the other hand. In the case of the shown circuit construction, $t_D$ is set to be $$0 < t_D < T/2.$$

Accordingly, the AND gate 238 provides a signal B having a rise edge which is delayed from the modulated carrier signal M-PSK by $t_D$ and a fall edge which coincides with the modulated carrier signal M-PSK. Each "H" period of this signal B is shorter than the modulated carrier signal by $t_D$.

The output signal B of the AND gate 238 is supplied to the AND gate 239 on one hand and is delayed by $t_D'$ in the delay circuit 237 and thereafter supplied to the AND gate 239 on the other hand. The delay amount $t_D'$ of the delay circuit 237 is set to be $$T/2 - t_D < t_D' < T/2 + t_D.$$

Accordingly, a "H" portion of the output signal of the AND gate 238 having a duration not larger than $(T'/2 - t_D)$ is eliminated.

Figure 24:
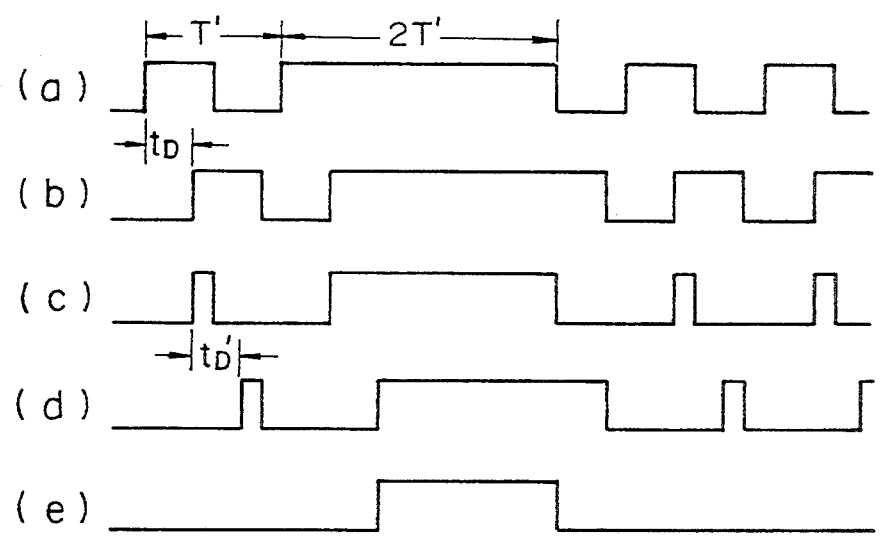
FIG. 24 is a timing chart illustrating the operation of the specific example shown in FIG. 23 by use of waveforms (a) to (e)

Directing attention to a portion of the modulated carrier signal M-PSK which takes "H" for only a time 2T', or a portion in which the digital data changes from "1" bit to "0" bit, as shown by a waveform (a) in FIG. 24, the output signal of the delay circuit 236 is as shown by a waveform (b) in FIG. 24 and therefore the output signal B of the AND gate 238 is as shown by a waveform (c) in FIG. 24. Thus, the output signal of the delay circuit 237 is as shown by a waveform (d) in FIG. 24. As a result, a signal corresponding the "H" period of 2T' as shown by a waveform (e) in FIG. 24 is obtained from the AND gate 239. Namely, the output signal of the AND gate 239 represents a timing at which the digital data of the modulated carrier signal M-PSK changed from "1" bit to "0" bit.

As for the "L" period of 2T' when the digital data changes from "0" bit to "1" bit, no signal is obtained by the circuit shown in FIG. 23. In order to enable the acquisition of such a signal, there can be used means which has the same construction as the circuit shown in FIG. 23, but is inputted with an inverted version of the modulated carrier signal. The original digital data is obtained by resetting a flip-flop circuit by an output signal of such means and setting the flip-flop circuit by the output signal of the circuit shown in FIG. 23.

Now, assume that n stages of circuits each including a delay circuit and an AND gate, as shown in FIG. 23, are cascade-connected and the total of the delay amounts of the delay circuits included is TD. In order to eliminate the "1" and "0" bit portions (or T'/2 period portions) of the modulated carrier signal and to surely leave the 2T' period portion for the boundary between "1" and "0" bits, it is required that the following relation is satisfied:

$$T/2 < TD < 2T'.$$

Then, in the case where the total delay amount TD is set to the period T' of the modulated carrier signal, a variation of TD is allowed in a range between −50% and +100%.

When a time width of T' is used for the boundary between "1" and "0" bits, the following relation should be satisfied:

$$T/2 < TD < T.$$

Then, in the case where TD is set to be $\frac{2}{3} \times T'$, a variation of TD is allowed in a range between $-25\%$ and $+50\%$ but this tolerance is narrow as compared with the case where the time width of $2T'$ is used. In general, as a time width or duration of a signal for the boundary between "1" and "0" bits is made larger, a tolerance for the variation of the total delay amount TD becomes larger. In this case, since it is required that a modulated portion has a phase difference of 180° between "1" and "0" bits, it is necessary that the time width of a signal for the boundary between "1" and "0" bits is integer times as large as the period $T'$ of the modulated carrier signal.

On the other hand, if the time width of a signal for the boundary between "1" and "0" bits is made larger, a portion of the modulated carrier signal at the boundary between "1" and "0" has a DC component for a longer time since the signal for the boundary between "1" and "0" has a constant level. When such a modulated carrier signal is transmitted between the reader/writer and the IC card, the DC component is not transmitted since the transmission of the signal is made through coils. As a result, a center level of the carrier signal has a large variation at that portion so that a distortion occurs. Therefore, the time width of a signal for the boundary between "1" and "0" bits cannot be made too large. Taking the above-mentioned tolerance for the variation of the total delay amount TD into consideration, it is preferable that the time width is $2T'$.

Figure 25:
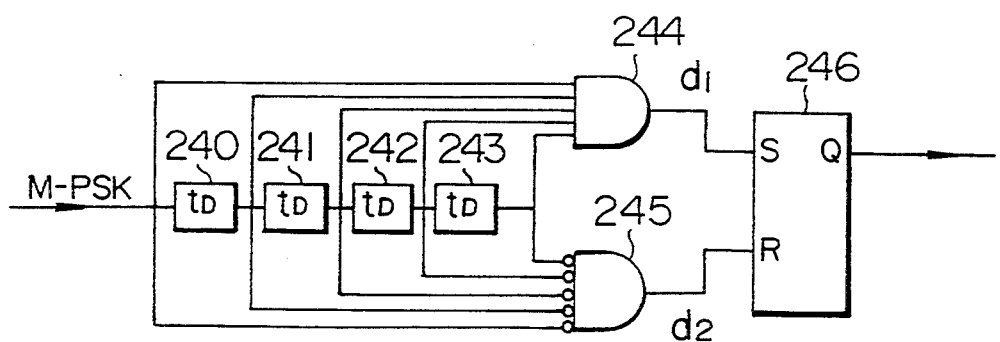
FIG. 25 is a circuit diagram showing the construction of another specific example of the demodulating for the embodiment circuit shown in FIG. 12.

FIG. 25 is a block diagram showing another specific example of means for demodulating the modulated carrier signal shown in FIG. 22. There is seen delay circuits 240 to 243, AND gates 244 and 245, and an SR-FF (set/reset flip-flop circuit) 246.

The specific example shown in FIG. 23 has been provided for each of the "H" and "L" signals at the boundaries between "1" and "0" bits. The specific example shown in FIG. 25 allows the detection of both the "H" and "L" signals by using delay circuits in common. Though four delay circuits are used in the shown example, the number of delay circuits may be arbitrary so long as it is not smaller than 2.

The modulated carrier signal M-PSK is supplied to the AND gate 244 directly on one hand and is supplied to the AND gate 245 after inversion on the other hand. Also, the signal M-PSK is delayed by the delay circuits 240 to 243 successively by a time $t_D$ in each delay circuit. An output signal of each of the delay circuits 240 to 243 is supplied to the AND gate 244 directly on one hand and is supplied to the AND gate 245 after inversion on the other hand.

By properly setting the delay amount $t_D$ of each of the delay circuits 240 to 243, the "H" signal at the boundary between "1" and "0" bits in the modulated carrier signal M-PSK is detected from the AND gate 244 in a manner similar to that in the specific example shown in FIG. 23 and the "L" signal is similarly detected from the AND gate 245. The SR-FF 246 is set by the output signal $d_1$ of the AND gate 244 and is reset by the output signal $d_2$ of the AND gate 245. Thereby, digital data demodulated from the modulated carrier signal is outputted from the Q terminal of the SR-FF 246.

The delay amounts of the delay circuits 240 to 243 may be different and each delay amount can be set such that only signals for the boundaries between "1" and "0" bits of the modulated carrier signal are obtained from the AND gates 244 and 245. In either case, the tolerance for a variation of the total delay amount of the delay circuits 240 to 243 is as mentioned above.

The present invention being thus described, it will be obvious that the same be varied in many ways. Such variations are not be regarded as a departure from the spirit and scope of the invention, and all such modifications as would be obvious to one skilled in the art intended to be included within the scope of the following claims.

What is claimed is:

1. A non-contact, electromagnetically coupled communication system including:

first and second communication units electromagnetically communicating data between said first and second communication units;

said first communication unit comprising:

first data processing means for processing data;

first electromagnetic transducing bi-functioning coil circuit for electromagnetically coupling a second electromagnetic transducing bi-functioning coil circuit of said second communication unit;

each bi-functioning coil circuit both electromagnetically transmitting and receiving data, respectively, the first bi-functioning coil also transmitting power, and the second bi-functioning coil also receiving power;

a driver circuit connected to said first electromagnetic transducer bi-functioning coil circuit and supplying a high-frequency signal to said second communication unit based on an output data from said first data processing means; and first receiving signal detecting circuit connected to said first electromagnetic transducing circuit for detecting the variation in an impedance of said second electromagnetic transducing bi-functioning coil circuit to demodulate the data from the second communication unit and supply the demodulated data to said first data processing means;

said second communication unit comprising:

second data processing means for processing data;

said second electromagnetic transducing bi-functioning coil circuit electromagnetically for coupling said first electromagnetic transducing bi-functioning coil circuit;

a power supply generating circuit connected to said second electromagnetic transducing bi-functioning coil and generating a predetermined supply voltage from a signal supplied from said first data communication unit;

a second receiving signal detecting means connected to said second electromagnetic transducing bi-functioning coil circuit for demodulating a signal supplied from said first data communication unit and supplying the demodulated signal to said second data processing means; and variable impedance means connected to said second electromagnetic transducing bi-functioning coil circuit for varying an impedance of said second electromagnetic transducing bi-functioning coil circuit in accordance with an output data from said second data processing means;

wherein said driver circuit is of low output impedance, and said first receiving signal detecting circuit includes a current detecting circuit in which a voltage drop, used as a detection output of the current detecting circuit, is sufficiently small, such that a voltage of the first bi-functioning coil circuit is substantially constant and such that a voltage of the second bi-functioning coil circuit is substantially constant, and therefore a voltage input to the power supply generating circuit is substantially constant notwithstanding operation of the variable impedance means.

2. A system according to claim 1, wherein said driver circuit includes two MOS switches which are alternately turned on and off in accordance with a high frequency signal.

3. A system according to claim 1, wherein said first receiving signal detecting circuit includes a magnetic coupling element, a primary coil of said magnetic coupling element connected to said coil circuit includes a magnetic coupling element, a primary coil of said magnetic coupling element connected to said coil circuit, a secondary coil, and a resistor connected between opposite ends of said secondary coil, and a voltage generated between opposite ends is outputted as the detection output.

4. A system according to claim 1, wherein said first receiving signal detecting circuit includes two diodes which are connected in parallel with each other with reverse polarities and are connected between one end of said coil circuit and the ground, and a voltage generated between opposite ends of said diodes is outputted as the detection output.

5. A system according to claim 1, wherein said first receiving signal detecting circuit includes a series circuit of a first diode and a resistor connected between one end of said coil circuit and a second diode connected in parallel with said first diode and with a polarity reverse to that of said first diode, and a voltage generated between opposite ends of said resistor is outputted as the detection output.

6. A non-contact IC card system in which a reader/writer and a non-contact IC card are electromagnetically coupled by coil means, and data transfer between said reader/writer and said non-contact IC card is made in such a manner that a high frequency signal transmitted from said reader/writer to said non-contact IC card is modulated by data, said non-contact IC card including:
   first data generating means for generating first data for transaction with said reader/writer,
   second data generating means for generating second data independent of said first data generated by said first data generating means,
   multiplex modulation means for doubly modulating said high frequency signal by the second data from said second data generating means in synchronism with the period of transmission of said first data between said reader/writer and said non-contact IC card, and
   means for transmitting the high frequency signal modulated by said multiplex modulation means to said reader/writer, said reader/writer including data detecting means for detecting and demodulating said first data and said second data from the high frequency signal received from said non-contact IC card.

7. A non-contact IC card system according to claim 6, wherein said data detecting means includes a circuit for detecting a data period of the high frequency signal in which the high frequency signal has been subjected to modulation by data and judging the presence/absence of said second data from a relationship between a level of the high frequency signal at an end portion of said data period and a level thereof immediately after the end portion.

8. A non-contact IC card system according to claim 6, said second data generating means includes abnormality detecting means for detecting an abnormal condition of said non-contact IC card, abnormality detection information of said abnormality detecting means being supplied as said second data to said multiplex modulation means.

9. A non-contact IC card system, comprising:
   at least one IC card for storing data; and
   a reader/writer unit for reading and writing data to and from each IC card;
   each IC card drawing its power from the reader/writer unit;
   communication between each IC card and the reader/writer unit being via a modulated signal,
      wherein the modulated signal is at least doubly modulated including a first and second modulation such that at least two distinct types of information are communicated per single communication;
      the first modulation being for reading and writing data to and from a respective IC card and the reader/writer unit; and
      the second modulation being for communication of abnormality information between the respective IC card and the reader/writer unit regarding whether a respective IC card was operating abnormally.

10. A system as in claim 9, wherein:
    the second modulation communicating abnormality information by judging one of an absence and presence of the abnormality information as a function of a relationship between a level of a single communication at an end of the single communication and a level immediately after the end of the single communication.

11. A non-contact IC card system, comprising:
    at least one IC card for storing data; and
    a low-output impedance reader/writer unit for reading and writing data to and from each IC card;
    each IC card drawing its power from the reader/writer unit;
    the reader/writer unit including at least one bi-functioning coil circuit, each bi-functioning coil circuit both electromagnetically receiving power from, and transmitting and receiving data to and from, respectively, the at least one IC card;
    each IC card including at least one bi-functioning card coil circuit, each bi-functioning card coil circuit both electromagnetically receiving power from, and transmitting and receiving data to and from, respectively, the reader/writer unit,
       each IC card's at least one bi-functioning coil circuit including a variable impedance means for varying an impedance of the bi-functioning coil circuit during transmission by the bi-functioning coil circuit,
       voltage fluctuation in the IC card's bi-functioning coil circuit being sufficiently small that power drawn by the IC card is substantially constant despite operation of the variable impedance means.

12. A system as in claim 11, wherein the reader/writer unit further includes:
    a current detection circuit, responsive to the at least one bi-functioning unit coil, producing a detection output indicative of the one of the data being received and the data being transmitted.

13. A system as in claim 12, wherein the current detection circuit includes:
   means for magnetically coupling to the bi-functioning unit coil circuit;
   a detecting coil responsive to the means for magnetically coupling; and
   a resistance connected in parallel with the detecting coil;
   wherein a voltage across the resistance being the detection output.

14. A system as in claim 12, wherein the current detection circuit includes:
   a first diode;
   a second diode;
   wherein the first and second diode being connected in parallel but being opposed in polarity to form a diode pair;
   wherein a voltage across the diode pair being the detection output.

* * * * *

UNITED STATES PATENT AND TRADEMARK OFFICE
CERTIFICATE OF CORRECTION

PATENT NO. : 5,418,353
DATED : May 23, 1995
INVENTOR(S) : Katayama, et. al.

It is certified that error appears in the above-indentified patent and that said Letters Patent is hereby corrected as shown below:

Title page, item [73], Assignee: should read as followings:

--Hitachi Maxell, Ltd., Osaka; NTT Data Communications Systems Corporation, Tokyo, both of Japan--

Signed and Sealed this

Seventh Day of May, 1996

Attest:

BRUCE LEHMAN

Attesting Officer                Commissioner of Patents and Trademarks